(12) United States Patent
Joshi et al.

(10) Patent No.: US 10,019,440 B2
(45) Date of Patent: Jul. 10, 2018

(54) METHODS AND APPARATUS FOR THREE-DIMENSIONAL (3D) SKETCHING

(75) Inventors: Pushkar P. Joshi, Fremont, CA (US); Cindy Marie Grimm, Clayton, MO (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1305 days.

(21) Appl. No.: 13/472,338

(22) Filed: May 15, 2012

(65) Prior Publication Data

US 2013/0127836 A1    May 23, 2013

Related U.S. Application Data

(60) Provisional application No. 61/491,078, filed on May 27, 2011.

(51) Int. Cl.
| | |
|---|---|
| *G06T 17/20* | (2006.01) |
| *G06T 19/00* | (2011.01) |
| *G06F 17/30* | (2006.01) |
| *G06T 11/20* | (2006.01) |

(52) U.S. Cl.
CPC ............ *G06F 17/30* (2013.01); *G06T 11/203* (2013.01); *G06T 17/20* (2013.01); *G06T 19/00* (2013.01)

(58) Field of Classification Search
CPC ....... G06T 17/10; G06T 11/203; G06T 19/20; G06T 2219/2016
USPC ........................................................ 345/422
See application file for complete search history.

(56) References Cited

U.S. PATENT DOCUMENTS

| | | | | |
|---|---|---|---|---|
| 7,750,911 | B2 * | 7/2010 | Bae ............................... | 345/442 |
| 2003/0222868 | A1 * | 12/2003 | Raskar .................... | G06T 17/10 |
| | | | | 345/419 |
| 2009/0231338 | A1 * | 9/2009 | Carr et al. ..................... | 345/423 |
| 2009/0284550 | A1 * | 11/2009 | Shimada ............. | G06F 17/5095 |
| | | | | 345/619 |

OTHER PUBLICATIONS

Apitz G., Guimbretière F.: CrossY: a crossing-based drawing application. In ACM SIGGRAPH 2005Papers (New York, NY, USA, 2005), SIGGRAPH '05, ACM, pp. 930-930.

(Continued)

*Primary Examiner* — Matthew Salvucci
(74) *Attorney, Agent, or Firm* — Wolfe-SBMC

(57) ABSTRACT

Methods and apparatus for 3D sketching may provide an interface for creating 3D drawings from 2D and 3D input, and for creating 3D curve networks. The technique may provide tools for 2D sketching that enable 2D sketching in 3D space, and for creating a network of intersecting 3D curves. The technique may provide user interface elements and techniques that facilitate the curve drawing tasks. For 2D sketching, the technique may provide methods for interpreting imprecise user 2D strokes as continuous, high-quality 3D curves. The technique may provide the ability to edit existing 3D curves using sketched 2D strokes. The technique may enable sketching of 3D curves by rotating a drawing plane and/or by creating drawing surfaces on which curves may be added. The technique may provide user interface elements for converting curves in 3D space into a curve network.

20 Claims, 28 Drawing Sheets

(56) References Cited

OTHER PUBLICATIONS

Bae S.-H., Balakrishnan R., Singh K.: Ilovesketch: as-natural-as-possible sketching system for creating 3d curve models. In Proceedings of the 21st annual ACM symposium on User interface software and technology (New York, NY, USA, 2008), UIST '08, ACM, pp. 151-160.

Brazil E. V., Macedo I., Sousa M. C., De Figueiredo L. H., Velho L.: Sketching variational hermite-rbf implicits. In Proceedings of the Seventh Sketch-Based Interfaces and Modeling Symposium (Aire-la-Ville, Switzerland, Switzerland, 2010), SBIM '10, Eurographics Association, pp. 1-8.

Bernhardt A., Pihuit A., Cani M.-P., Barthe L.: Matisse: Painting 2D regions for modeling free-form shapes. In Eurographics Workshop on Sketch-Based Interfaces and Modeling, SBIM 2008, Jun. 2008 (Annecy, France, Jun. 2008), Alvarado C., Cani M.-P., (Eds.), pp. 57-64.

Cohen J. M., Markosian L., Zeleznik R. C., Hughes J. F., Barzel R.: An interface for sketching 3d curves. In Proceedings of the 1999 symposium on Interactive 3D graphics (New York, NY, USA, 1999), I3D '99, ACM, pp. 17-21.

Cherlin J. J., Samavati F., Sousa M. C., Jorge J. A.: Sketch-based modeling with few strokes. In Proceedings of the 21st spring conference on Computer graphics (New York, NY, USA, 2005), SCCG '05, ACM, pp. 137-145.

Grimm C., Hughes J.: Implicit generalized cylinders using profile curves. In Implicit Surfaces (Jun. 1998), pp. 33-41.

Igarashi T., Matsuoka S., Tanaka H.: Teddy: a sketching interface for 3d freeform design. In Proceedings of the 26th annual conference on Computer graphics and interactive techniques (New York, NY, USA, 1999), SIGGRAPH '99, ACM Press/Addison-Wesley Publishing Co., pp. 409-416.

Joshi P., Carr N. A.: Repoussé: Automatic inflation of 2d artwork. In SBM (2008), pp. 49-55.

Kurtenbach G., Buxton W.: User learning and performance with marking menus. In Proceedings of the SIGCHI conference on Human factors in computing systems: celebrating interdependence (New York, NY, USA, 1994), CHI '94, ACM, pp. 258-264.

Karpenko O., Hughes J. F., Raskar R.: Epipolar methods for multi-view sketching. In Proceedings of Eurographics workshop on Sketch-based Interfaces and Modeling (SBIM '04) (Grenoble, France, 2004), Jorge J. A. P., Galin E., Hughes J. F., (Eds.), Eurographics Association, pp. 167-173.

Macedo I.: Generalized interpolation of implicit surfaces using radial basis functions PhD thesis, IMPA, Dec. 21, 2010, 84 pages.

Marinkas D., Zeleznik R. C., Laviola Jr. J. J.: Shadow buttons: exposing wimp functionality while preserving the inking surface in sketch-based interfaces. In Proceedings of the 6th Eurographics Symposium on Sketch-Based Interfaces and Modeling (New York, NY, USA, 2009), SBIM '09, ACM, pp. 159-164.

Nealen A., Igarashi T., Sorkine O., Alexa M.: Fibermesh: designing freeform surfaces with 3d curves. In ACM SIGGRAPH 2007 papers (New York, NY, USA, 2007), SIGGRAPH '07, ACM.

Olsen L., Samavati F. F.: Stroke extraction and classification for mesh inflation. In Proceedings of the Seventh Sketch-Based Interfaces and Modeling Symposium (Airela-Ville, Switzerland, Switzerland, 2010), SBIM '10, Eurographics Association, pp. 9-16.

Olsen L., Samavati F. F., Sousa M. C., Jorge J. A.: Sketch-based modeling: A survey. Computers Graphics 33, 1 (2009), 85-103.

Rivers A., Durand F., Igarashi T.: 3d modeling with silhouettes. In ACM SIGGRAPH 2010 papers (New York, NY, USA, 2010), SIGGRAPH '10, ACM, pp. 109:1-109:8.

Rubio J. M., Janecek P.: Floating pie menus : Enhancing the functionality of contextual tools. Learning (2002), 39-40.

Rose K., Sheffer A., Wither J., Cani M.-P., Thibert B.: Developable surfaces from arbitrary sketched boundaries. In Proceedings of the fifth Eurographics symposium on Geometry processing (Aire-la-Ville, Switzerland, Switzerland, 2007), Eurographics Association, pp. 163-172.

Schmidt R., Khan A., Singh K., Kurtenbach G.: Analytic drawing of 3d scaffolds. In ACM SIGGRAPH Asia 2009 papers (New York, NY, USA, 2009), SIGGRAPH Asia '09, ACM, pp. 149:1-149:10.

Schmidt R., Wyvill B., Sousa M. C., Jorge J. A.: Shapeshop: Sketch-based solid modeling with blobtrees. In Proceedings of Eurographics workshop on Sketch-based Interfaces and Modeling (SBIM '05) (Dublin, Ireland, 2005), Jorge J. A. P., Igarashi T., (Eds.), Eurographics Association, pp. 53-62.

Schaefer S., Warren J., Zorin D.: Lofting curve networks using subdivision surfaces. In Proceedings of the 2004 Eurographics/ACM SIGGRAPH symposium on Geometry processing (New York, NY, USA, 2004), SGP '04, ACM, pp. 103-114.

Wolin A., Eoff B., Hammond T.: Shortstraw: A simple and effective corner finder for polylines. 2008, p. 33-40.

\* cited by examiner

*2D strokes*

*3D curves*

*3D surfacing* or

*RBF surfaces*

*patches*

FIG. 21A  FIG. 21B
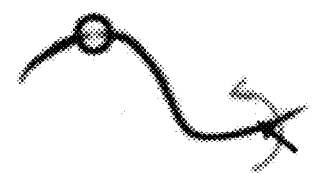
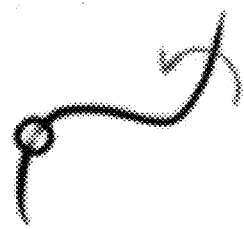
FIG. 21C  FIG. 21D
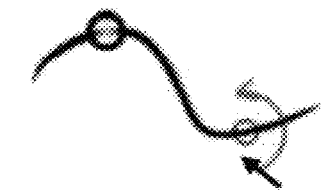
FIG. 21E  FIG. 21F

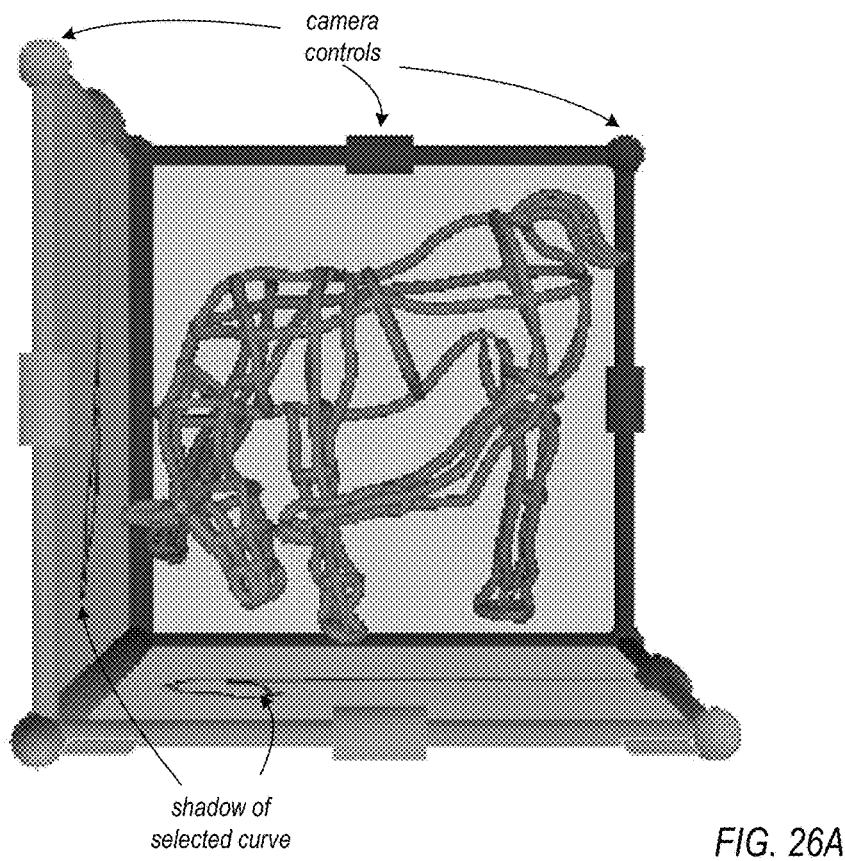
FIG. 26A
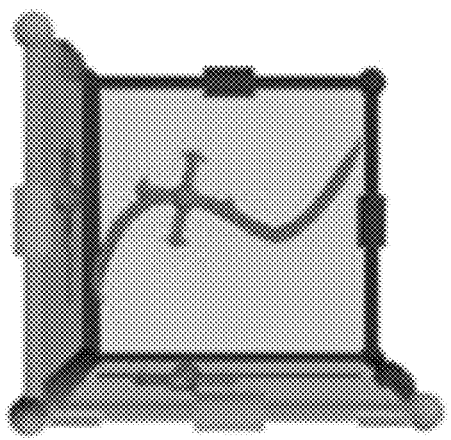 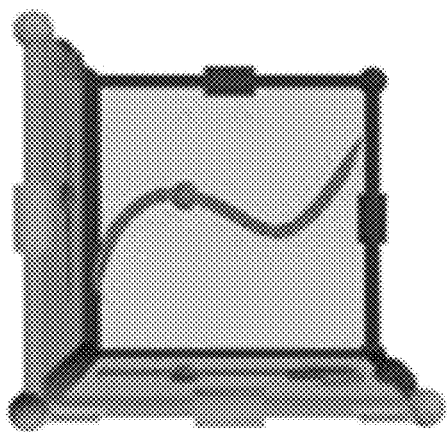
FIG. 26B            FIG. 26C

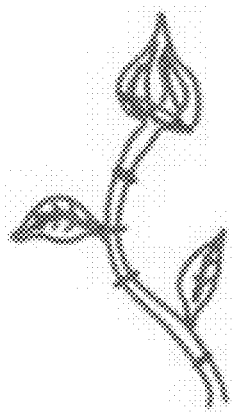 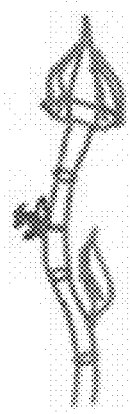 
FIG. 29A  FIG. 29B  FIG. 29C
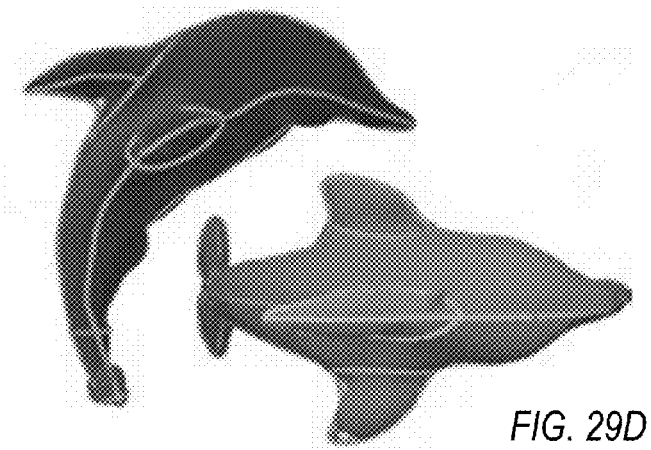
FIG. 29D
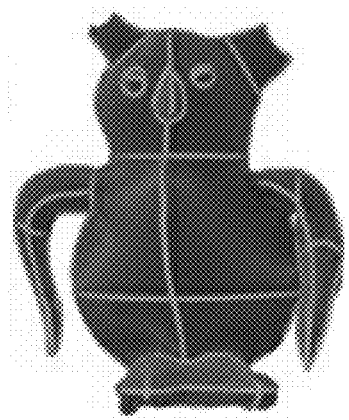 
FIG. 29E  FIG. 29F

METHODS AND APPARATUS FOR THREE-DIMENSIONAL (3D) SKETCHING

PRIORITY INFORMATION

This application claims benefit of priority of U.S. Provisional Application Ser. No. 61/491,078 entitled "Methods and Apparatus for Three-Dimensional (3D) Sketching," filed May 27, 2011, the content of which is incorporated by reference herein in its entirety.

BACKGROUND

Description of the Related Art

Sketching or drawing on paper is a natural way to create and envision shapes. A goal of three-dimensional (3D) sketching techniques is to leverage this ability in order to create 3D models on the computer. However, there are several challenges inherent in this process. First, people, even trained artists, may find it difficult to correctly sketch existing objects, let alone ones that are still in the design stage. Second, people have an extraordinary ability to interpret even very loose and sketchy drawings as valid 3D objects, and are comfortable with ambiguities in those drawings. Third, sketching with a tablet creates two-dimensional (2D) input, which must be interpreted as 3D data in some way. This interpretation is tricky because the drawings are not likely to be correct, but people nevertheless may have a strong expectation of how that drawing should be interpreted.

SUMMARY

Various embodiments of methods and apparatus for three-dimensional (3D) sketching are described. Embodiments of a 3D sketching technique for sketching curves in 3D space are described that may provide a spontaneous, casual interface for creating a 3D curve network that is, for example, suitable as a wireframe model of a 3D shape. Embodiments may, for example, provide tools and methods for aspects of 3D curve sketching including, but not limited to two-dimensional (2D) sketching, enabling the 2D sketching system in 3D space, and computing a network of intersecting 3D curves. For these aspects, embodiments may provide user interface elements, may enable design decisions, and may provide techniques that facilitate the curve drawing task.

For the 2D sketching aspect, embodiments may provide techniques for interpreting imprecise user strokes as continuous, high-quality curves desired by the user. Embodiments may also provide the ability to edit existing curves using sketched user strokes. Embodiments may also enable sketching of 3D curves by allowing the user to rotate the drawing plane. Embodiments may also allow the user to select curve subsets that define a drawing surface, thereby creating a curved drawing surface on which 3D curves can be added. Embodiments may also provide user interface elements for converting the curves in 3D space into a curve network, such as snapping to intersection points and assigning and manipulating surface normals at intersection points.

BRIEF DESCRIPTION OF THE DRAWINGS

FIGS. 21A through 21F illustrate translating, scaling, and rotating a curve, according to at least some embodiments.

FIGS. 26A through 26C illustrate a shadow box, according to at least some embodiments.

FIGS. 29A through 29F show several examples of 3D objects created with an embodiment of the 3D sketching system.

Figure 1:
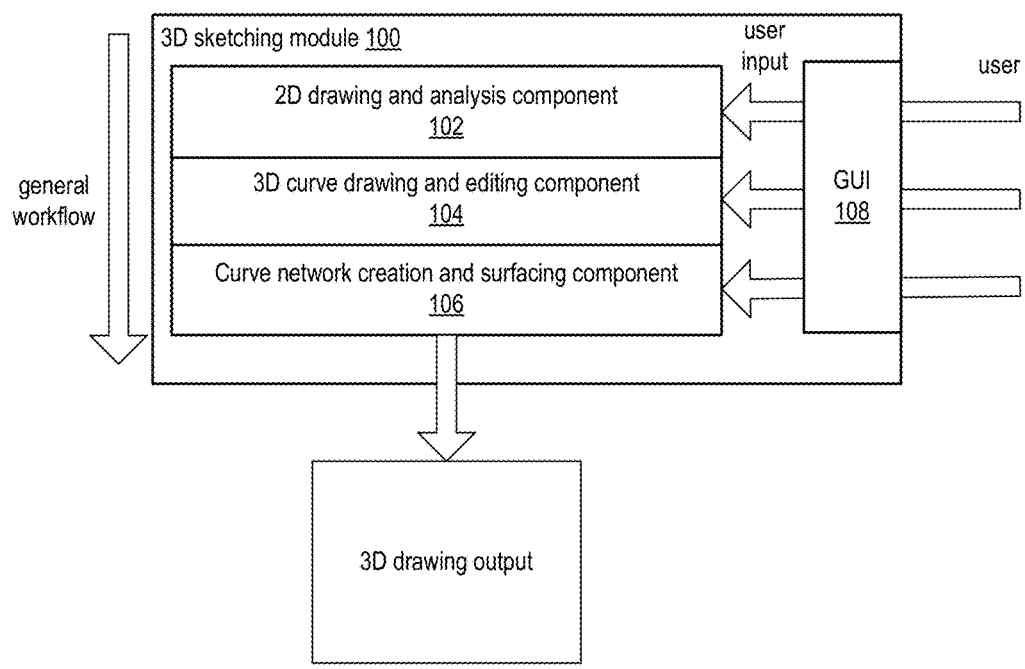
FIG. 1 illustrates components of and a general workflow for the 3D sketching technique, according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for three-dimensional (3D) sketching are described. Embodiments of a 3D sketching technique are described that support a natural two-dimensional (2D) drawing style, while adding interface elements that may guide the user in how 2D strokes are interpreted as 3D curves. As much as is possible, 3D curve drawing should look and feel like 2D curve drawing. Unlike conventional inflation-based 3D drawing systems, embodiments of the 3D sketching technique may enable the user to build a 3D curve network, which can then be surfaced and edited. This makes it possible to create surfaces that do not have a natural planar silhouette. The 3D curve network (or even a 2D drawing) may be a goal in and of itself. Embodiments of the 3D sketching technique may be interactive, with the user explicitly creating curves in 3D, unlike at least some conventional systems that infer 3D from a static drawing.

Figure 32:
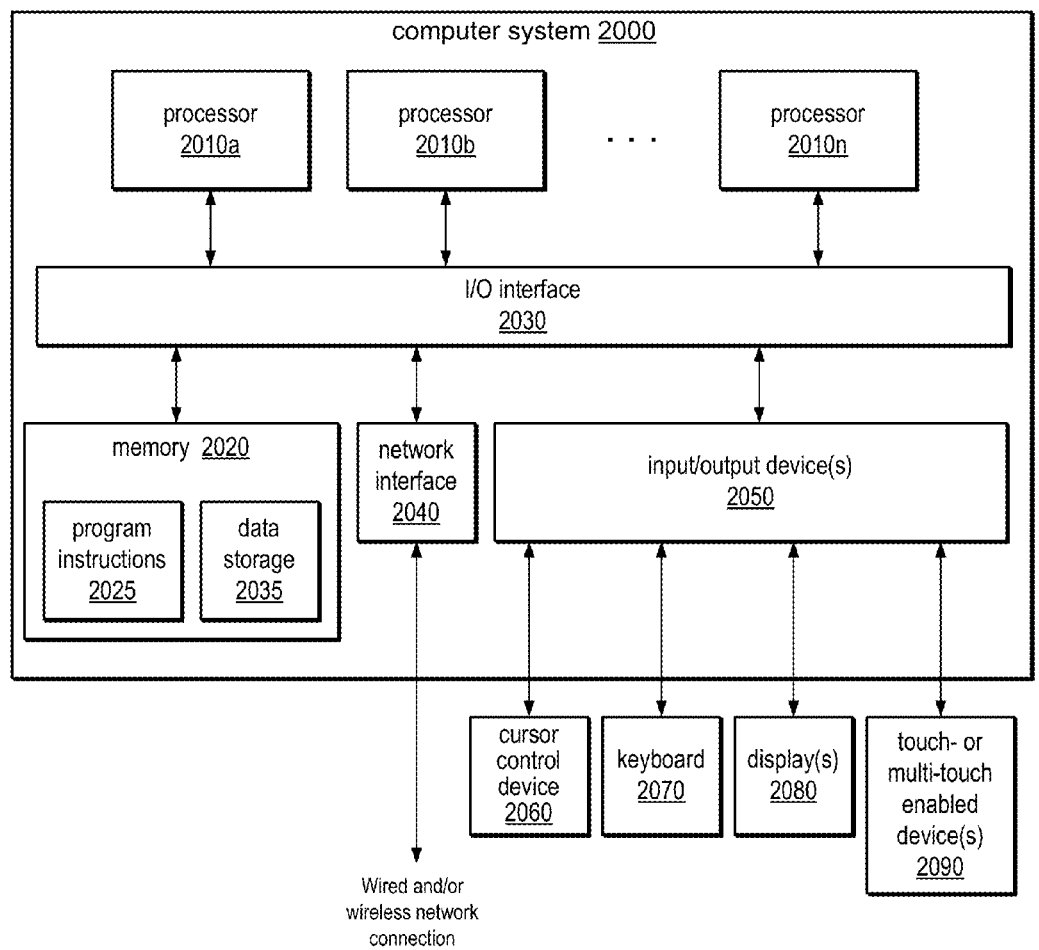
FIG. 32 illustrates an example computer system that may be used in embodiments.

In embodiments of the 3D sketching technique, a general workflow may be from 2D drawing, to 2.5D to 3D editing, to surfacing, although the user may be allowed to move back and forth between these modes or layers. FIG. 1 illustrates components of and a general workflow for the 3D sketching technique, according to at least some embodiments. As shown in FIG. 1, the 3D sketching technique may be performed by a 3D sketching module 100, which may be implemented by program instructions stored in a computer-readable storage medium and executable by one or more processors (e.g., one or more CPUs or GPUs). FIG. 32 illustrates an example computer system on which embodiments of module 100 may be implemented. The 3D sketching module 100 may include, but is not limited to, a 2D drawing and analysis component 102, a 3D curve drawing and editing component 104, a curve network creation and surfacing component 106, and a graphical user interface (GUI) 108. An example user interface is illustrated in FIGS. 30A through 30D.

As illustrated in FIG. 1, in at least some embodiments, a system architecture of the 3D sketching technique may be arranged according to a three-layer model. In the first layer, implemented as 2D drawing and analysis component 102, marks (strokes) made by the user may be analyzed in order to add the strokes into the projected drawing. This analysis may evaluate each stroke to determine, for example, if the stroke is a new curve, and/or if the stroke extends, edits, or closes an existing curve. In the second layer, implemented as 3D curve drawing and editing component 104, the system provides support for 3D curve drawing and editing in the form of sketching surfaces (drawing planes, extrusion and inflation surfaces), direct manipulation of curves in 3D, and adding depth values to 2D strokes based on existing 3D curves that the strokes are applied to. In the third layer, implemented as curve network creation and surfacing component 106, consistent curve networks may be created and surfaced. A consistent curve network in this context is a curve network in which, where curves look like they intersect, they actually do, and in which each curve has a normal orientation consistent with the eventual surface. The interface to the 3D sketching technique, implemented as GUI 108, may include, but is not limited to, tools, both automatic and semi-automatic, for visualizing and establishing consistency. The interface may, for example, be used to create, adjust and surface a 3D curve network. In at least some embodiments, GUI 108 may include different interfaces and/or user interface elements to support user interactions at each of the three levels or phases (2D drawing and analysis, 3D curve drawing and editing, and curve network creation and surfacing) of the 3D sketching technique. Note that, while FIG. 1 shows the general workflow as proceeding from 2D drawing to curve network creation and surfacing, the user may move back and forth between 2D drawing 102, 3D curve drawing and editing, and/or curve network creation and surfacing in a drawing session.

Figure 2:
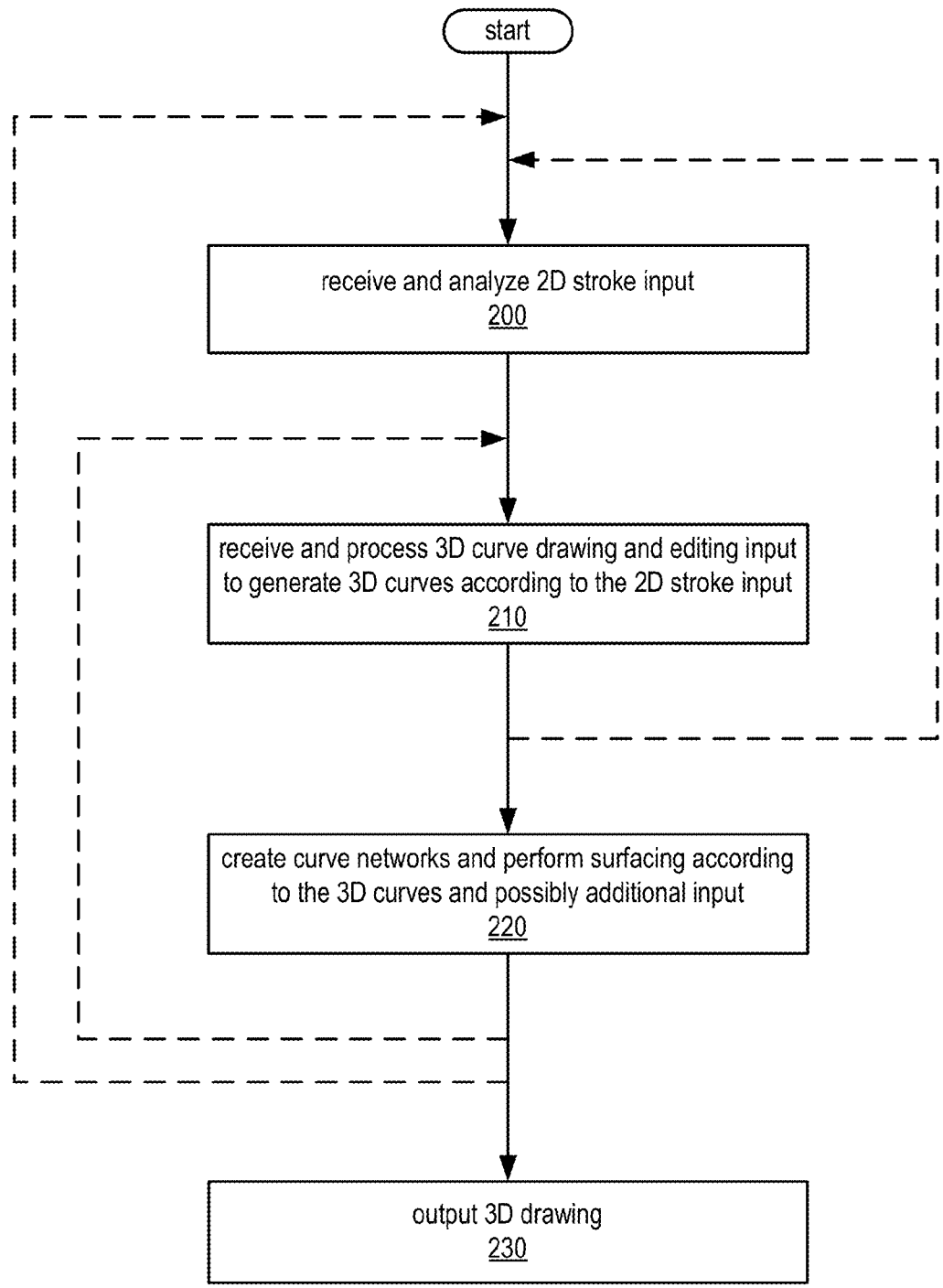
FIG. 2 is a flowchart of a high-level workflow for 3D sketching, according to at least some embodiments of the 3D sketching technique.

FIG. 2 is a flowchart of a high-level workflow for 3D sketching, according to at least some embodiments of the 3D sketching technique. As indicated at 200, two-dimensional (2D) stroke input may be received and analyzed. The analysis may, for example, determine characteristics of and relationships among the two or more 2D strokes. As indicated at 210, 3D curve drawing and editing input may be received and processed. The processing may, for example, determine 3D curves from the input 2D stroke input according to the 3D curve drawing and editing input. As indicated at 220, consistent curve networks may be generated and surfaced from the previously analyzed and processed inputs. Additional user input may be received and applied in generating and surfacing the curve networks. As indicated at 230, a 3D drawing may be output, for example displayed, printed, and/or stored to a storage medium.

As indicated by the dashed arrows in FIG. 2, the user may move back and forth between 2D drawing, 3D curve drawing and editing, and/or curve network creation and surfacing, in a drawing session. Elements 200 through 230 of FIG. 2 are described in more detail below.

Figure 3A:
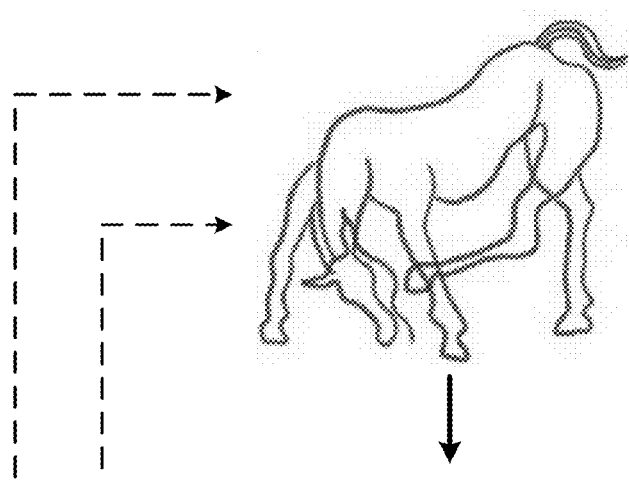
FIGS. 3A through 3E graphically illustrate a high-level workflow for 3D sketching, according to at least some embodiments of the 3D sketching technique.
Figure 3B:
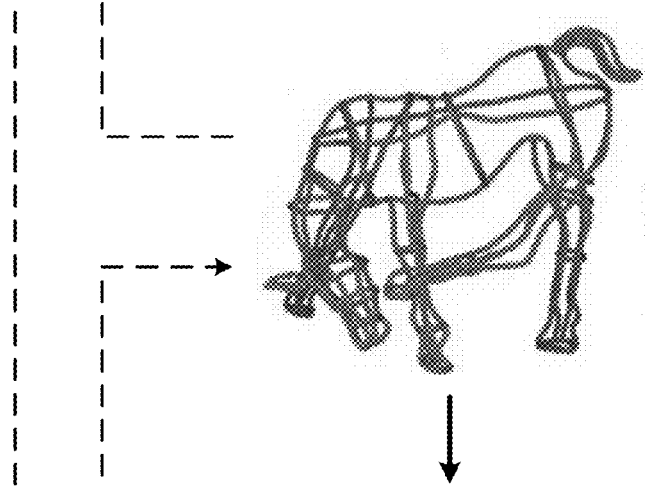
Figure 3C:
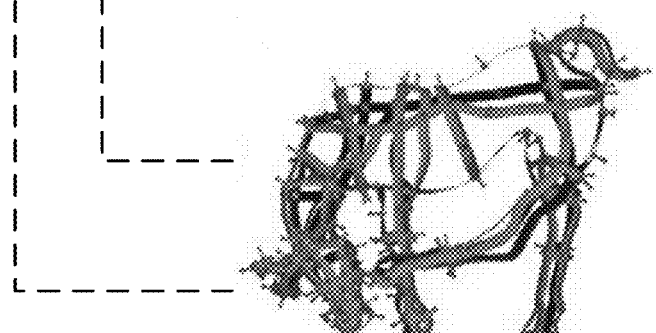
Figure 3D:
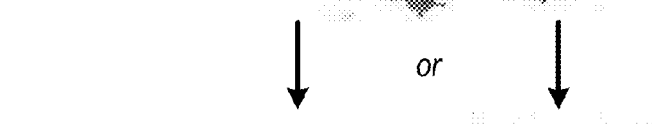
Figure 3D:
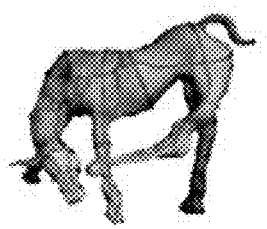
Figure 3E:
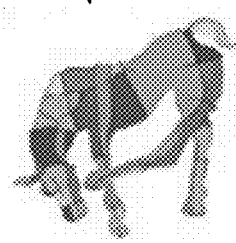

FIGS. 3A through 3E graphically illustrate a high-level workflow for 3D sketching, according to at least some embodiments of the 3D sketching technique. In FIG. 3A, 2D are received and processed to generate a 2D sketch. In FIG. 3B, 3D curve drawing and editing input is received and processed to generate a 3D sketch or model. In FIG. 3C, 3D surfacing input is received and processed to perform 3D surfacing. The 3D surfacing input may include "snapping" the curve network of FIG. 3C together and specifying normals where needed in order to create radial basis function (RBF) surfaces (FIG. 3D) or patches (FIG. 3E). As indicated by the dashed arrows in FIGS. 3A-3C, the user may move back and forth between 2D drawing, 3D curve drawing and editing, and/or curve network creation and surfacing, in a drawing session.

A single 2D curve can be created by an artist in a variety of ways, from one long stroke to multiple, disjoint strokes. In embodiments, a 2D sketching component (2D drawing and analysis component 102) may support a variety of sketching styles. For example, at least some embodiments may incorporate oversketching and multi-stroke sketching on any visible curve, and may also provide the ability to "scratch" back and forth, combine and close curves by sketching, and merge strokes that are separated by small gaps. A curve may be arbitrarily "bendy," and may have sharp corners.

In at least some embodiments, a 2D editing component and interface may be provided that may include one or more of, but is not limited to, context-aware interface elements and functionality, in-screen menus, pie-menus, and a Cross-Y interface style. At least some embodiments may take advantage of the in-screen pie-menus in performing one-stroke selection. For example, to select a region of a curve, the user may tap on the curve to bring up a curve menu, and may then move the cursor in the menu item and "scrub over" the part of the curve to be selected.

In at least some embodiments, a 3D curve drawing and editing component and interface may provide one or more of, but not limited to, visualization, single-view 3D curve creation, and depth assignment. For visualization, at least some embodiments may implement a "shadow box" drawing technique to simultaneously provide 3D depth cues, drawing plane control, and camera control. At least some embodiments may support different drawing styles and shaders depending on the tasks at hand. Specifically, at least some embodiments may use depth-based shading combined with 3D geometry, shading, and shadows to provide 3D depth cues on curves, and a ribbon rendering method for editing curve orientation. For 3D curve creation not in the view plane, at least some embodiments may allow the user to create drawing planes, extrusion surfaces, and/or temporary inflation surfaces on which curves can be drawn. At least some embodiments may also provide two or more methods for orienting a drawing plane relative to existing geometry.

For 3D surface creation, in at least some embodiments, a curve network creation and surfacing component and interface may provide visualization and interface support for automatically and semi-automatically snapping curves together and orienting the curves. In particular, at least some embodiments may employ a ribbon rendering method that may be used in visualizing and editing the curve orientation (e.g., which direction is "out"). At least some embodiments may employ a Hermite radial basis function (RBF) technique, with an additional tangent constraint, for surface creation, but any surfacing approach may be used instead.

Embodiments of the 3D sketching technique may focus on creating 3D curves as an end-goal in and of itself. At least some embodiments may incorporate interface elements such as camera control, extrusion planes, curve-based selection of planes, etc. Embodiments may be more free-form and paint-system like than conventional systems. In embodiments, strokes may be applied to any curve, not just the currently active curve as in many conventional systems. At least some embodiments may support oversketching, merging with strokes, and scratch-style input, not just multi-strokes as in many conventional systems. At least some embodiments may use oversketching from arbitrary views, rather than explicit epipolar two-view sketching as in many conventional systems, to create 3D curves. At least some embodiments may provide rendering cues and shaders to help disambiguate the 3D curve drawings. At least some embodiments may provide explicit support for turning curves into a consistent curve network, unlike many conventional systems.

Embodiments of the 3D sketching technique may also be used to post-process curve networks produced by other mechanisms or techniques than those described herein in order to surface the curve networks.

At least some embodiments may use drawings from two different views to create a 3D curve. Embodiments may treat this as an editing problem, instead of as a construction problem as in many conventional systems. In at least some embodiments, the first stroke may always create a 3D curve (usually on the film plane). The user then moves the camera and edits the curve (either by over stroking or extending it with another stroke), rather than explicitly drawing a new curve from that second view. This leads to a slightly different formulation of the 3D reconstruction problem (see the section titled Adding depth values to the stroke) and gets around the cognitive problem of trying to determine which two curves to sketch.

Unlike conventional inflation surface 3D sketching techniques, embodiments may push surface creation to the end of the modeling process, rather than starting with it. This may have the advantage of not limiting the types of surfaces that can be created. Embodiments may create a portion or all of a surface, and then use that surface to draw new curves on. The curves can then be edited on the surface. In that sense, inflation surfaces can be seen as a subset of the types of surfaces that embodiments of the 3D sketching technique can create.

In at least some embodiments, a Hermite radial basis function (RBF) formulation may be employed to create surfaces from the curve network. Embodiments may provide a more extensive and complete curve editing system than do conventional systems, with a mix of interactive and automatic approaches (as opposed to purely automatic approaches) for establishing the normal orientations.

At least some embodiments may support gestures and sketching to create specific surface model types from a small number of curves. In some embodiments, an inflation surface and a technique for sliding the drawing plane may provide at least a portion of this functionality. At least some embodiments may provide functionality to create surfaces to sketch on and/or to create replicated curves.

Sketching Interface

This section describes a sketching interface for the 3D sketching technique, according to at least some embodiments. The sketching interface is shown as GUI 108 in FIG. 1. An example user interface is illustrated in FIGS. 30A through 30D. The sketching interface may mimic the freedom of pencil and paper while supporting the creation of well-behaved curves from the user's individual strokes. The discussion in this section is primarily directed to 2D aspects of the sketching interface—from the user's point of view, they are sketching on a 3D drawing projected using the current view direction. The section titled Adding depth values to the stroke describes adding the third dimension to strokes as or after the curves are created.

For the purpose of this discussion, the notions of strokes and curves are distinguished. A stroke may be defined as a 2D curve, for example created by a single mouse down, move, mouse up user interaction. Curves may be defined as 3D entities with a defined normal direction. A curve may be made up of one or more processed strokes. When the user makes a new stroke, the stroke may be processed to, for example, determine if the stroke should be added to an existing curve, or if the stroke should create or start a new curve. In embodiments, a new stroke can be added to an existing curve in a number of ways, for example as illustrated in FIGS. 10A through 10I and 11A through 11F. In at least some embodiments, ways in which a stroke may be added to a curve may include one or more of but are not limited to:

Merge the stroke to the end of a curve, possibly replacing the current curve end. See, e.g., FIG. 10C.
Join the stroke to the end of a curve, bridging a small gap. See, e.g., FIG. 10F.
Replace some part of the interior of a curve with the stroke (oversketching). See, e.g., FIG. 10H.
Merge the stroke with the last stroke(s) and apply the combined result as a single oversketch (partial oversketch). See, e.g., FIG. 10I.
Merge two curves into one using the stroke. See, e.g., FIG. 10G.
Close the curve with the stroke. See, e.g., FIG. 10D.
Create a new, closed curve. See, e.g., FIG. 10B.
Create a new curve from one or more strokes. See, e.g., FIG. 10A, FIG. 10E.

Figure 10A:
FIGS. 10A through 10I illustrate several ways that a stroke can be added to a curve, according to at least some embodiments.
Figure 10B:
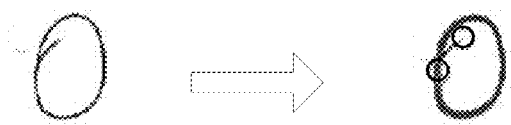
Figure 10C:
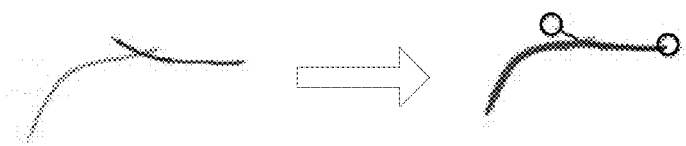
Figure 10D:
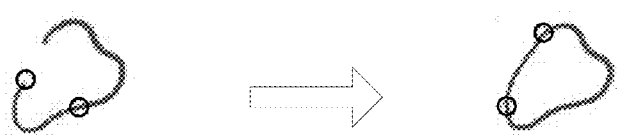
Figure 10E:
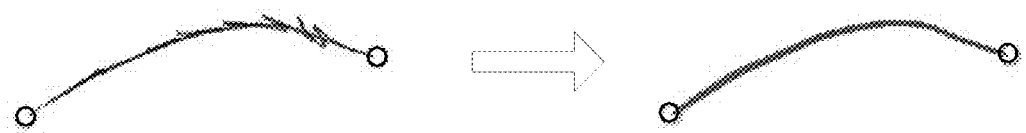
Figure 11A:
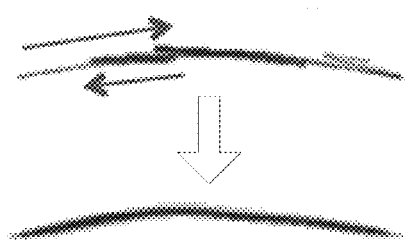
FIGS. 11A through 11F further illustrate several ways that a stroke can be added to a curve, according to at least some embodiments.

In at least some embodiments, before a stroke is added to a curve, the stroke is first analyzed to see if it contains fold-overs, for example due to a scratch-back-and-forth motion (see, e.g., FIGS. 10E and 11A). If it does, the fold-overs may be removed to create a non-folded stroke (see the section titled Fold-overs and blending). Similarly, if the user places multiple strokes one on top of the other, these strokes may be first blended together into a single stroke before being processed (see, e.g., FIGS. 11B and 11D).

To maintain the feel of drawing, the user can add a stroke to any curve at any time. The system may automatically determine which curve (if any) a newly added stroke belongs to. In at least some embodiments, the system may favor adding a stroke to a curve the user is currently working on. If the system gets it wrong, the user can override that decision or delete the stroke, for example using a pop-up menu invoked by tapping at the end of the stroke (see the section titled Menus; also see FIGS. 19A through 19C for an example).

At least some embodiments may provide one or more user interface elements and methods that may aid the user in creating and editing curves. In at least some embodiments, the drawing canvas can be panned, zoom-rotated, or centered on a curve or selection of curves using a background pop-up menu (see the section titled Menus). In at least some embodiments, the user can select part or all of the curve and erase, smooth, or drag the selection. In at least some embodiments, if the drawing gets cluttered, the user can hide curves via the interface. In at least some embodiments, hidden curves may still be faintly or partially visible but may not be considered for stroke edits. In at least some embodiments, the user can turn on or off various stroke-curve actions (blend, join, partial oversketch, etc.), determine how much default smoothing is applied, and/or change how close a stroke needs to be to a curve for merging with the curve via the interface.

In at least some embodiments, the sketching interface may provide user interface elements and methods to support scratch-back-and-forth, oversketch, and partial oversketch techniques. Artists may often create longer curves by joining together smaller strokes. Artists may also move a marker or pencil back and forth along a curve without lifting it, or may draw over the same stroke multiple times. At least some embodiments may support this type of drawing by simply processing the stroke(s) into a single, non-folded stroke, as described herein.

At least some embodiments may allow the user to create an oversketch stroke using multiple, generally short strokes. This may be referred to as a partial oversketch operation. This differs slightly from an oversketch operation in which the strokes are treated as a sequence of over-strokes applied one after the other because the user can join the merged oversketch stroke anywhere on the original curve.

Figure 10F:
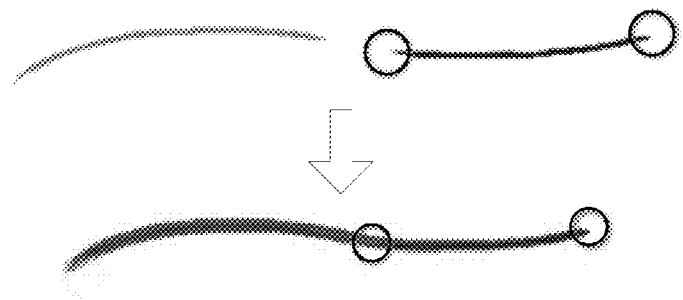
Figure 10G:
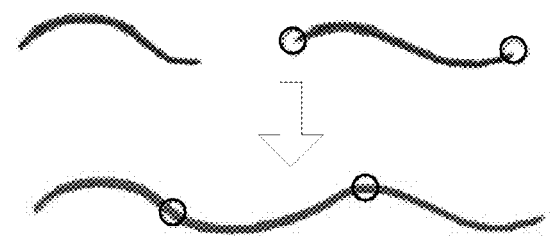
Figure 10H:
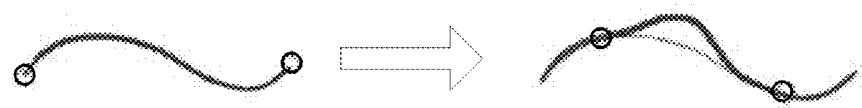
Figure 10I:
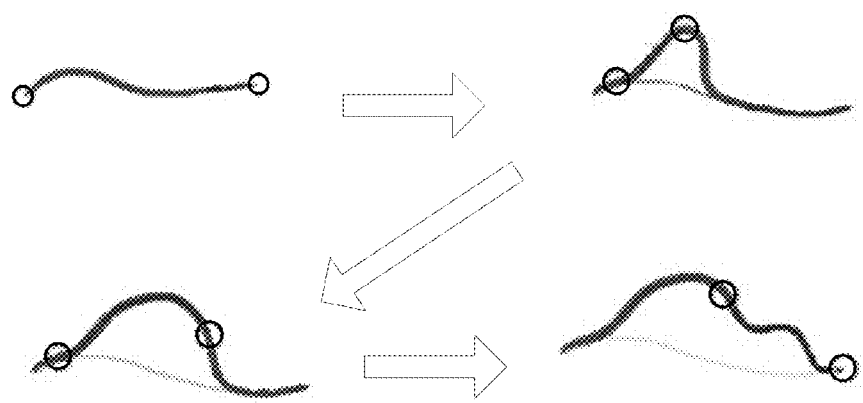

FIGS. 10A through 10I show examples of various ways in which a stroke can be added to a curve, according to at least some embodiments. In these examples, the circles at the end of a curve or stroke indicate endpoints. FIG. 10A illustrates a single open curve, according to at least some embodiments. The curve may, for example, be generated from a single smooth stroke, or by scratching back and forth (see, e.g., FIG. 10E), or by joining or merging two or more strokes, two or more curves, or a stroke and one or more curves (see, e.g., FIGS. 10F and 10G, as well as FIGS. 10A, 10B, and 10C). FIG. 10B illustrates creating a closed curve from a single stroke, according to at least some embodiments. FIG. 10C illustrates merging a stroke to an end of a curve, according to at least some embodiments. FIG. 10D illustrates closing a curve with a stroke, according to at least some embodiments. FIG. 10E illustrates a technique in which the user scribbles back and forth (left); the input is then processed to generate a single, smooth curve (right). FIG. 10F illustrates joining a stroke to an end of a curve, bridging a small gap, according to at least some embodiments. FIG. 10G illustrates merging two curves into a single curve, using a stroke, according to at least some embodiments. FIG. 10H illustrates an example oversketching operation via which the user may modify or replace a part of a curve using a stroke, according to at least some embodiments. FIG. 10I illustrates a more complicated example of an oversketching operation in which an original curve (upper left) is modified with a first stroke (upper right). A second stroke further modifies the curve (lower left). Finally, a fourth stroke modifies the curve (lower right). In at least some embodiments, the operation of FIG. 10I may be performed as a partial oversketch operation in which the strokes are first merged, and the combined results are applied as a single oversketch to the curve.

Figure 11B:
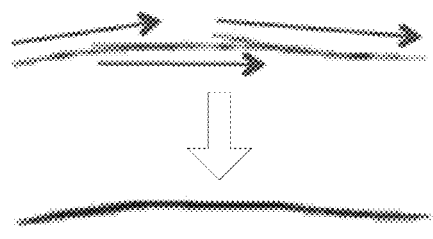
Figure 11C:
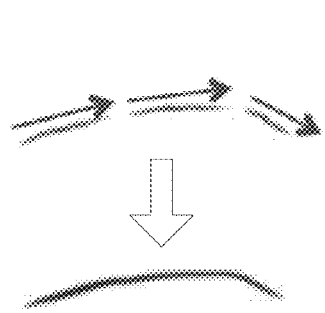
Figure 11D:
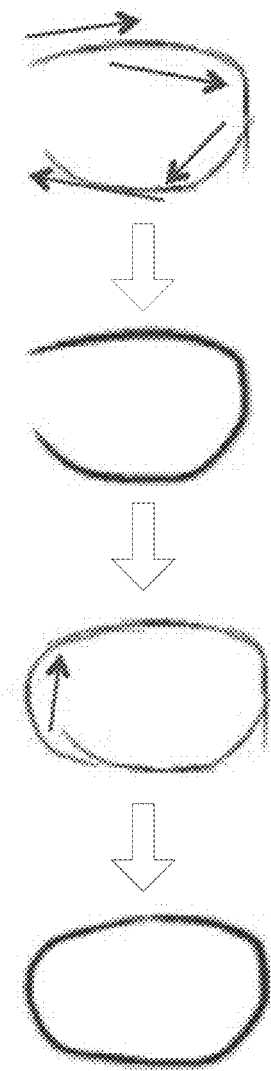
Figures 11E, 11F:
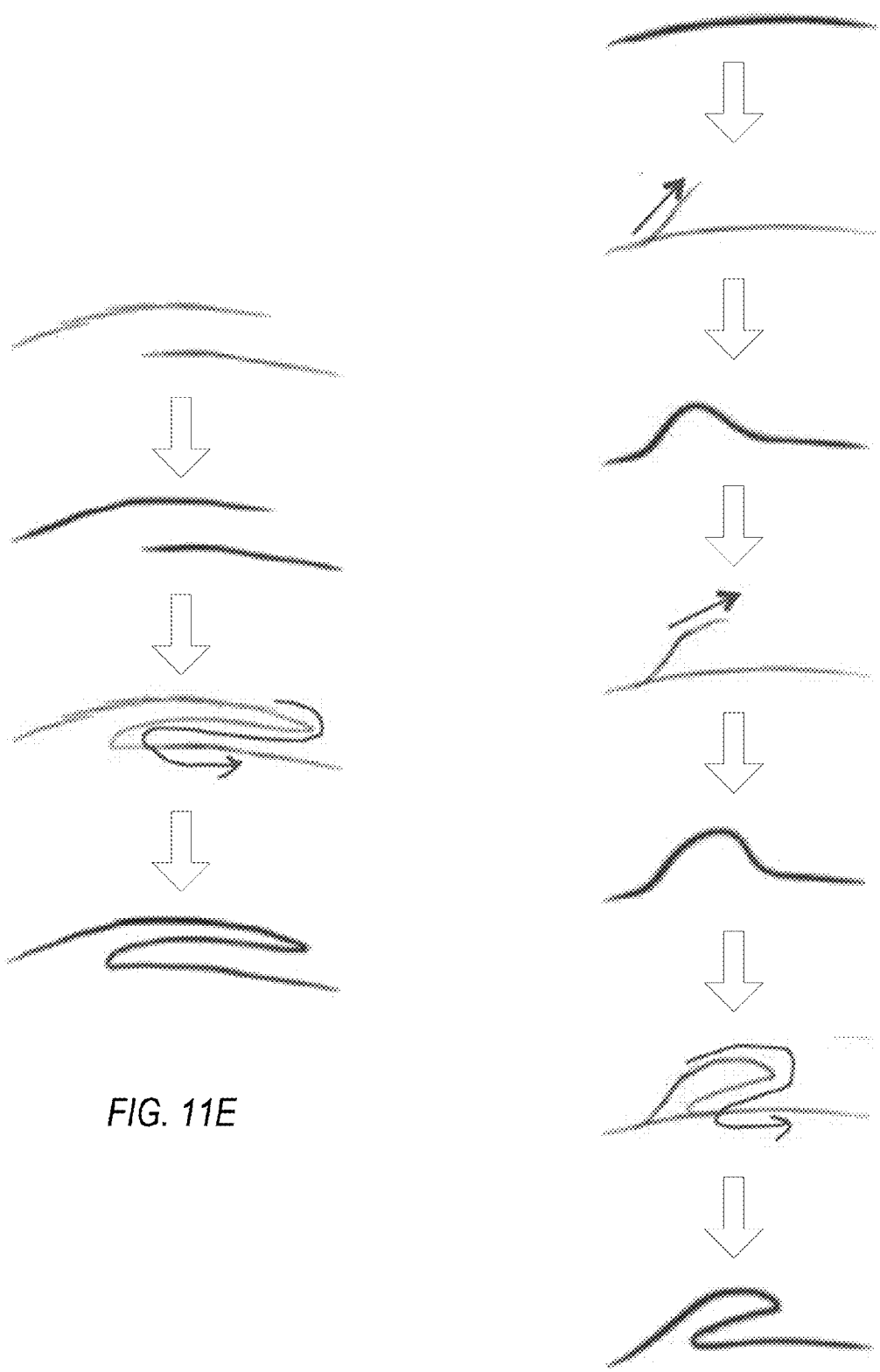

FIGS. 11A through 11F provide additional examples of joining strokes to curves via the user interface. FIG. 11A illustrates generating a single curve from a series of back-and-forth strokes, according to at least some embodiments. FIG. 11B illustrates a multi-stroke operation according to at least some embodiments in which the user draws two or more overlapping strokes, which are then merged into a single curve. FIG. 11C illustrates a multi-stroke operation according to at least some embodiments in which the user draws two or more strokes that are substantially aligned at the ends; the strokes may be merged into a single curve by closing the gaps. FIG. 11D illustrates an operation according to at least some embodiments in which the user first draws an open curve (second image from top) using one or more strokes (top image). The open curve is then closed using a single stroke to produce the closed curve in the last image. FIG. 11E illustrates an operation according to at least some embodiments in which the user first draws two strokes (top image) that result in two curves (second image from top). A single stroke (third image from top) is then used to join the two curves into a single curve (last image). FIG. 11F illustrates a multi-stroke oversketch, according to at least some embodiments. The top image illustrates a curve to be modified. In the second image, an oversketch stroke is used to generate the modified curve in the third image. In the fourth image, a second oversketch stroke is used to generate the modified curve in the fifth image. In the sixth image, a third stroke is used to generate the modified curve in the final image.

Stroke Processing

This section describes how strokes are processed into curves, in at least some embodiments. Strokes as used herein are 2D curves, generally made by a single pen down, draw, pen up action. Curves as used herein are 3D entities with a defined normal direction, and may be built up out of one or more processed strokes. A goal is to mimic, as best as possible, the freedom of pencil and paper while still supporting the creation of well-behaved curves from the user's individual strokes. When the user draws a stroke, the stroke input may be analyzed to determine if the stroke input should create a new curve, be added to an existing curve (extending or oversketching), or join together two existing curves, for example. In embodiments, this analysis may be broken up into steps or stages, for example as illustrated in FIGS. 4A and 4B.

Figure 4A:
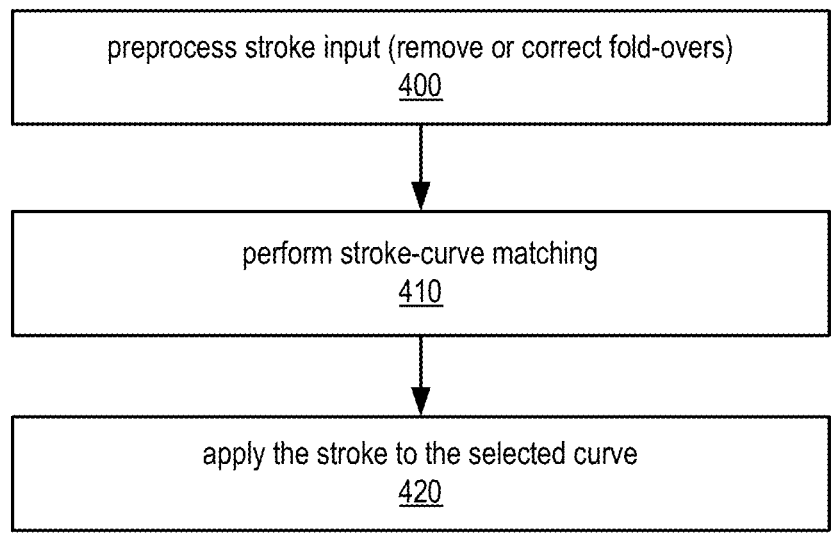
FIGS. 4A and 4B illustrate a high-level method for processing a stroke into a curve, according to at least some embodiments.
Figure 4B:
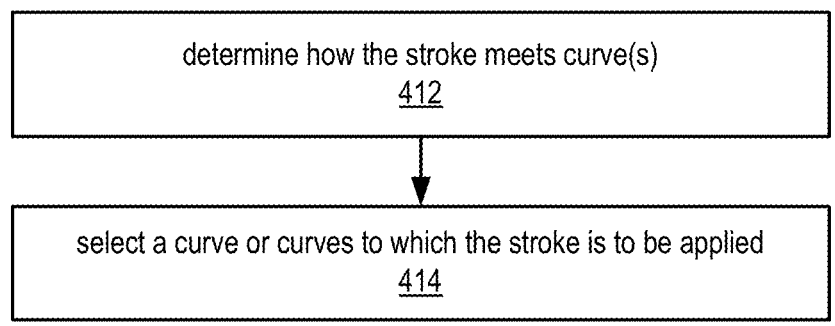

FIGS. 4A and 4B illustrate a high-level method for processing a stroke into a curve, according to at least some embodiments. In at least some embodiments, the processing of an incoming stroke may be broken into steps or stages, as shown in FIGS. 4A and 4B. As indicated at 400 of FIG. 4A, stroke input may be preprocessed, for example to detect and process fold-overs or overlapping, blended strokes. For example, if the user scratches back and forth to create a curve, this stroke input may be converted to a smooth single stroke (see, e.g., FIG. 10E). See the section titled Fold-overs and blending for details on how stroke input may be preprocessed to handle fold-overs. As indicated at 410, stroke-curve matching may be performed to determine which curve(s), if any, the stroke is to be applied to, and, if the stroke is to be applied to curve(s), how the stroke is to be applied to the curve(s).

As shown in FIG. 4B, in at least some embodiments, stroke-curve matching 410 may involve performing an analysis to determine how the stroke meets existing curve(s), as indicated at 412. This analysis may determine, for each curve, if it makes sense to apply the stroke to the curve, and if so, how the stroke would be applied to the curve (e.g., merge, oversketch, close). As indicated at 414 of FIG. 4B, according to the analysis performed at 412, a particular one or more of the curves to which the stroke is to be applied may be selected. See the section titled Stroke-curve matching for more details on a method for performing stroke-curve matching as indicated at 410 of FIG. 4A and.

As indicated at 420 of FIG. 4A, after stroke-curve matching 410 has been performed, the stroke may be applied to the selected curve as determined by the stroke-curve matching 410 process.

In at least some embodiments, element 414 of FIG. 4B and element 420 of FIG. 4A may incorporate 3D information; element 400 of FIG. 4A and element 412 of FIG. 4B, however, may be performed primarily in 2D. The elements of FIGS. 4A and 4B are further described in the sections below.

For all stages of processing as illustrated in FIGS. 4A and 4B, it may be assumed that the user has set a 2D distance threshold d, which may be visualized, for example, as a circle around the cursor. Threshold d may be converted to a 3D distance, for example using a film plane centered on the curves. In at least some embodiments, the 2D and 3D curves may be stored as a list of points. Threshold d may also be used to control the re-sampling of the points; curves drawn with the camera zoomed in may have closer-sampled points than ones with the camera zoomed out. In at least some embodiments, a default smoothing parameter s may be provided, for example by user input. Smoothing parameter s may determine how many times Laplacian smoothing is applied to the strokes before the strokes are merged with a curve. In at least some embodiments, it may be assumed that the strokes and curves are arc-length parameterized on the range [0, 1].

Fold-Overs and Blending

As indicated at 400 of FIG. 4A, stroke input may be preprocessed, for example to detect and process fold-overs and/or overlapping, blended strokes. A fold-over may be defined as a section of a stroke that has corners at either end and that is within a distance d of the previous part of the stroke (or falls off the end). This distinguishes a fold-over from a corner in the curve. In at least some embodiments, to find fold-overs, a Short Straw algorithm may be used to find corners, and then the stroke may be broken into pieces or sections at the corners. Some embodiments may use other techniques or algorithms to perform these tasks. A check of each section may be performed to see if the section lies on top of the previous section; if not, it was a corner and not a fold-over, and that section is joined to the previous section. Note that a section may be allowed to extend past the previous section.

A blend condition may be defined as when a stroke could be a fold-over of the previous stroke, i.e., the stroke is within the threshold distance for the entire length and does not extend (much) past the end of the previous stroke. The latter condition may be necessary to distinguish a blend from a merge.

In at least some embodiments, once the stroke has been broken up into its fold-over sections (or a sequence of blend strokes have been collected), a single, non-folded stroke may be constructed from the pieces. It is possible to simply apply some sort of weighted averaging to the points, but this tends to result in a scalloped look because the section ends tend to "stick up" (see, e.g., FIG. 12D). In addition, averaging everywhere may lose the flavor of the original stroke. Instead, at least some embodiments may extend each section so that the respective section merges into the blended curve, and then may morph the sections towards the average, moving the ends more than the middles. Once the sections are in agreement, the points may be sorted topologically, and downsampling may be performed to reduce the number of points.

In at least some embodiments, an averaging function may be defined that takes in a set of curves and a point. The point is projected to each of the curves, and only those points that project to the interior of the curve are kept. The curve points may be weighted by their distance to the input point and averaged. To extend a section, a Hermite curve may be added, with one end on the section's end and the other end projected 3d away (e.g., geodesically) using the averaging function. If the section is near the end of the blended curve, the section may instead be extended in the direction of the tangent.

Figure 12A:
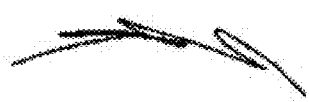
FIGS. 12A through 12E illustrate a technique for processing fold-overs, according to at least some embodiments.
Figure 12B:
Figure 12C:
Figure 12D:
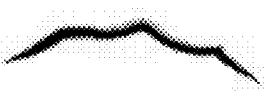
Figure 12E:

FIGS. 12A through 12E illustrate a technique for processing fold-overs, according to at least some embodiments. FIGS. 12A and 12B illustrate fold-overs generated by a back-and-forth sketching technique. The stroke may be divided into sections, and then each section may be extended each section using a projection operator, as shown in FIG. 12C. Simple averaging leaves "scallops", as shown in FIG. 12D, and does not allow for intentional corners. Thus, in at least some embodiments, a different technique may be used, described below, that produces the results shown in FIG. 12E.

Figure 13A:
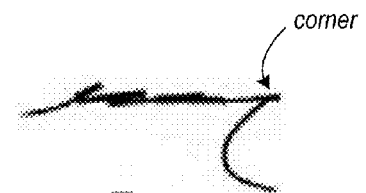
FIGS. 13A and 13B illustrate an example in which the stroke input includes a corner, according to at least some embodiments.
Figure 13B:
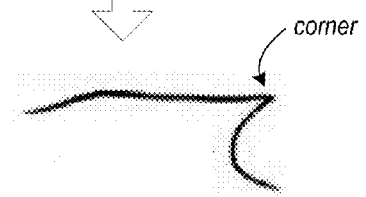

FIGS. 13A and 13B illustrate an example in which the stroke input includes a corner, according to at least some embodiments. FIG. 13A illustrates stroke input that includes fold-overs generated by a back-and-forth sketching technique. The stroke input includes a corner. FIG. 13B illustrates a single curve generated from the stroke input of FIG. 13A. Note that the corner is preserved.

Figure 14A:
FIGS. 14A and 14B illustrate extending and blending two strokes to form one curve, according to at least some embodiments.
Figure 14B:

FIGS. 14A and 14B illustrate extending and blending two strokes (FIG. 14A) to form one curve (FIG. 14B), according to at least some embodiments.

Figure 15A:
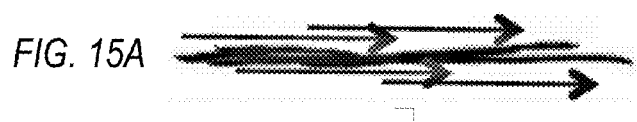
FIGS. 15A and 15B illustrate a multi-blend operation according to at least some embodiments.
Figure 15B:
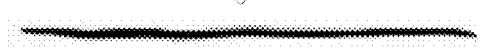

FIGS. 15A and 15B illustrate a multi-blend operation according to at least some embodiments in which several strokes that overlap substantially (FIG. 15A) are treated as blends, and from which a single curve (FIG. 15B) is generated.

Stroke-Curve Matching

As indicated at 410 of FIG. 4A, stroke-curve matching may be performed to determine which curve(s) the stroke is to be applied to, and how the stroke is to be applied to the curve. The ways in which a stroke can come close to a curve are many and complicated. In at least some embodiments, stroke-curve matching may be performed in steps, for example as illustrated in FIG. 4B. As indicated at 412 of FIG. 4B, an analysis may be performed to determine how the stroke meets the curve at the stroke ends. This analysis may determine, for each curve, if it makes sense to apply the stroke to the curve, and if so, how the stroke would be applied to the curve (e.g., merge, oversketch, close). As indicated at 414 of FIG. 4B, a particular one of the curves that is to be edited with the stroke may be selected. In at least some embodiments, the directions of the joins may be analyzed to determine what kind of match, if any, is available. For this stage, in at least some embodiments, all 3D curves may be projected onto the current film plane to create 2D curves. The following first provides details of an analysis technique for determining how the stroke meets the curve at the stroke ends, according to at least some embodiments, followed by a technique for selecting a curve to which the stroke is to be applied, according to at least some embodiments.

Determining how a Stroke Meets a Curve

As indicated at 412 of FIG. 4B, an analysis may be performed to determine how the stroke meets the curve at the stroke ends. A goal is to determine if it makes sense to apply the stroke to a curve, and if so, how the stroke is to be applied to the curve.

Figure 5:
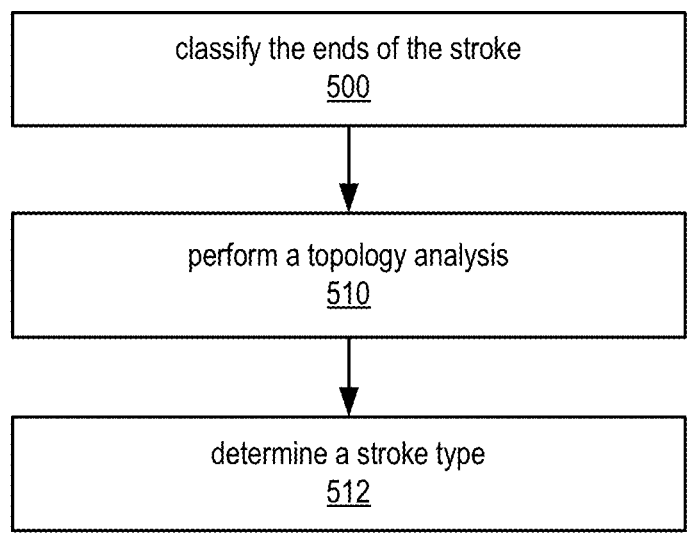
FIG. 5 is a flowchart of a high-level method for determining how a stroke meets a curve, according to at least some embodiments.
Figure 6:
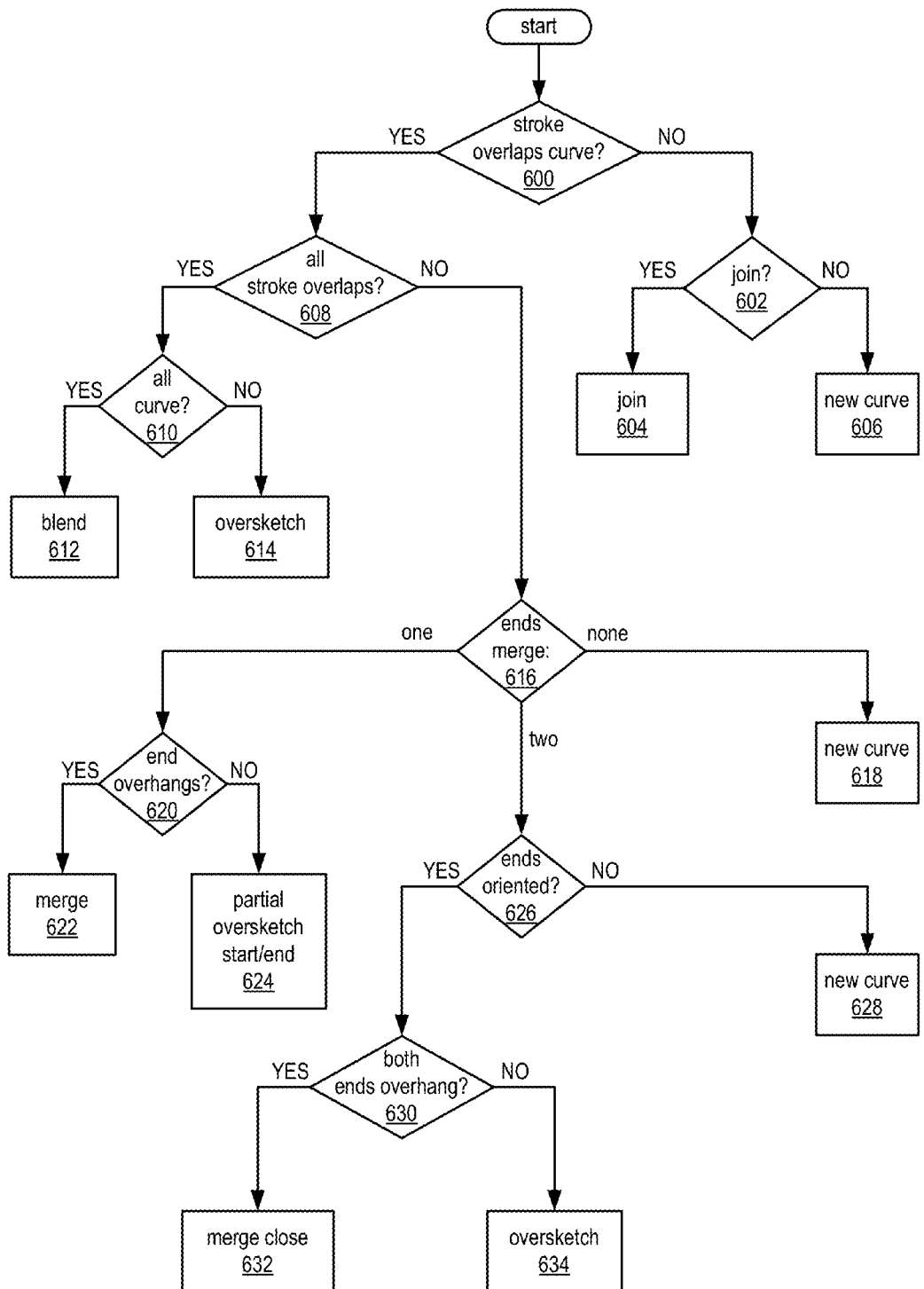
FIG. 6 shows a decision tree that may be implemented in at least some embodiments for determining the stroke type.

FIG. 5 illustrates that, in at least some embodiments, the decision-making performed at 412 of FIG. 4B to determine how a stroke meets a curve may be broken into several steps. As indicated at 500, the ends of the stroke may be classified. In at least some embodiments, this classification may determine if one or both of the endpoints of the stroke meet the curve smoothly. As indicated at 510, a topology analysis may be performed. The topology analysis may, for example, rule out cases where both ends of the stroke meet the curve, but not in any way that makes sense according to one or more criteria. As indicated at 520, the stroke type may be determined according to at least the information determined at 500 and 510. In at least some embodiments, the stroke type may be determined according to factors including one or more of but not limited to the end-classifications, whether the stroke meets the curve once or twice, where (ends or middle) the stroke meets the curve, and whether or not the stroke overhangs the end of the curve. FIG. 6 shows a decision tree that may be implemented in at least some embodiments for determining the stroke type. Output of the analysis performed at element 412 of FIG. 4B may include at least the stroke type determined at element 520 of FIG. 5. The following provides more detail for the elements of FIG. 5.

In at least some embodiments, this analysis may be performed with projected 3D curves and a 2D stroke, so the equations in the following sections are in 2D.

Classifying Ends

As indicated at 500 of FIG. 5, the ends of the stroke may be classified. FIGS. 16A through 16F graphically illustrate merge and join tests used in stroke-curve end matching, according to some embodiments. At least some embodiments may support one or both of two types of stroke-curve end matching. The first is a merge: the stroke end starts near the curve, then travels along it for some distance without back-tracking or moving further away than a threshold d. See FIG. 16B for an example. The second is a join: the stroke end does not overlap the curve, but the stroke and the curve ends can be joined with a short arc. See FIG. 16E for an example. In at least some embodiments, d is a screen-based selection distance that may be specified by the user (see the circle labeled d in FIG. 16B).

Merge Test

Figure 16A:
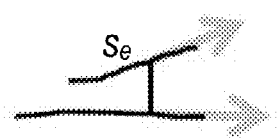
FIGS. 16A through 16F graphically illustrate merge and join testing used in stroke-curve end matching, according to some embodiments.

Referring to FIG. 16A, the end of the stroke $s_e$ may be defined as a fraction (e.g., ⅓) of the length of the stroke, or 3d along the stroke, whichever is smaller. Let $s_s \subset s_e$ be the largest contiguous region that is 1) within distance 1.5d of the curve, 2) does not fold back on the curve, 3) does not project off of the end of the curve, 4) whose angle with the closest point on the curve is less than ¾π. Let $s_c$ be the corresponding part of the curve the stroke projects to, $d_a$ be the average distance, and $\alpha_s$ be the average angle. Then it is not a merge if any of the following are true:

$$\|s_s\|<(¼)d \text{ and } d_a<0.1d$$

$$\|s_s\|<(¾)d \text{ and } d_a<0.2d$$

$$d_a>1.1d \text{ or } \alpha_a>¾π$$

$$\|s_s\|=0 \|s_s\|<\|s_s\|/2 \qquad (1)$$

The first three tests rule out strokes that meet at right angles or are too far away, the last test makes sure the stroke is not projecting to different parts of the curve.

Figure 16D:
Figure 16B:
Figure 16E:
Figure 16C:
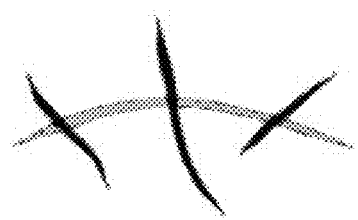

FIGS. 16B and 16C graphically illustrate the merge test, according to at least some embodiments. In both FIGS. 16B and 16C, an existing curve is represented by a gray line, while new strokes(s) are represented by dark line(s). FIG. 16B shows an example curve and strokes that pass the merge test. FIG. 16C shows an example curve with strokes that fail the merge test.

Join Test

Since strokes and curves can have small "hooks" at the end, at least some embodiments may search for the best join between an end of the stroke and an end of the curve (up to 2d in from the end). Referring to FIG. 16D, given point $p_s$ on the end of the stroke and a point $p_c$ on the end of the curve, a good join may be defined as follows. Let $d_j$ be the distance between the end points: $d_j=\|p_s-p_c\|$. Let $v=(p_c-p_s)/d_j$, and let $v_{s,c}$ be the unit tangent at $p_s$ and $p_c$, respectively. Using $\alpha_{s,c}=<v, v_{s,c}>$, two terms may be defined: $\alpha_d$ indicates how well-balanced the two angles are, and $\alpha_t$ measures the total angle. In at least some embodiments, all of the following must be true for a valid join:

$$\alpha_d=(|\alpha_c-(\alpha_c+\alpha_s)|+|\alpha_s-(\alpha_c+\alpha_s)|)/2<0.2$$

$$\alpha_t=(\alpha_c+\alpha_s)<0.3$$

$$0<d_j<8d \qquad (2)$$

In at least some embodiments, to find the best vector, the ends of the stroke and curve (up to a distance 2d from the end) may be searched to find the one that minimizes a combination of the equations (weighted towards minimizing the average difference).

In at least some embodiments, from all of the valid joins, the join with the best score $0.2\alpha_d+0.8\alpha_t$ may be picked. Additionally, in at least some embodiments, any join with $\alpha_c<π/2$ out-scores a join with $\alpha_c>π/2$.

Figure 16F:

FIGS. 16E and 16F graphically illustrate the merge test, according to at least some embodiments. In both FIGS. 16E and 16F, an existing curve is represented by a gray line, while new strokes(s) are represented by dark line(s). FIG. 16E shows an example curve and strokes that pass the join test. FIG. 16F shows an example curve with strokes that fail the join test.

Topology Analysis

As indicated at 510 of FIG. 5, a topology analysis may be performed. It is possible for both ends of a stroke to meet a curve well from a geometric standpoint, but still not be valid. In at least some embodiments, a topology analysis may be performed in which the stroke is oriented so that the tangents at the start of the stroke line up with the curve. If the other end of the stroke is now pointed in the opposite direction with respect to the curve, then the stroke can be ruled out.

Figure 17A:
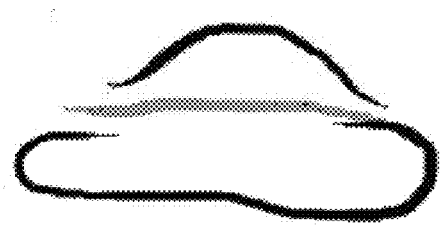
FIGS. 17A and 17B graphically illustrate a topology analysis, according to at least some embodiments.
Figure 17B:
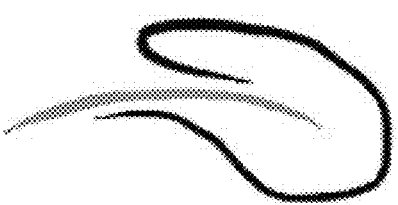

FIGS. 17A and 17B graphically illustrate a topology analysis, according to at least some embodiments. In both FIGS. 17A and 17B, an existing curve is represented by a gray line, while new strokes(s) are represented by dark line(s). FIG. 17A shows an example curve and strokes that pass the topology analysis. FIG. 17B shows an example curve with a stroke that fails the topology analysis.

Determining Stroke Type

To analyze how the stroke meets the curve, another piece of information may be needed—whether the stroke overhangs the end of the curve. This is true if, while walking along the stroke, back-tracking or fold-over with respect to the curve does not occur, and at some point the walk ends up off the end of the curve.

In at least some embodiments, it may be assumed that the stroke is oriented in the same direction as the curve. In at least some embodiments, given the ability to identify stroke ends as "merge" or "join" and whether the end is an "overhang", a stroke may be classified as follows. The last two stroke types are special cases of the first two. Note that these classifications are graphically illustrated in FIGS. 18A through 18H:

Oversketch: an oversketch exists if both stroke ends merge with the curve, the merge directions are the same with respect to the curve, and the start of the stroke merges with the curve before the end of the stroke (no overhangs). If the curve is closed, then the latter check is not needed (the stroke over-strokes where the curve ends meet). See, e.g., FIGS. 18A and 18B for an example.

Extend: One end of the stroke either merges and overhangs or joins with the curve; the other end does not merge or join. See, e.g., FIGS. 18C and 18D for an example.

Partial oversketch: one stroke end merges with the curve but does not overhang the end of the curve. See, e.g., FIGS. 18E and 18F for an example.

Extend and close: The second end does merge or join with the curve, but at the other end of the curve and there is an overhang for both ends. See, e.g., FIGS. 18G and 18H for an example.

Figure 18A:
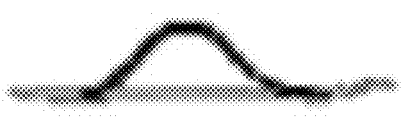
FIGS. 18A through 18H graphically illustrate stroke classifications, according to at least some embodiments.
Figure 18B:
Figure 18C:
Figure 18D:
Figure 18E:
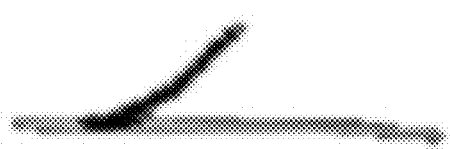
Figure 18F:
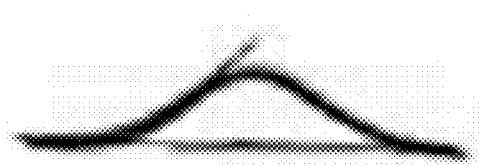
Figure 18G:
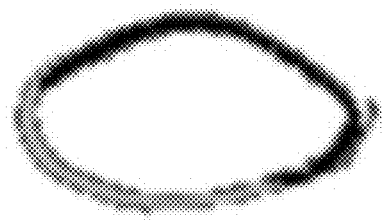
Figure 18H:
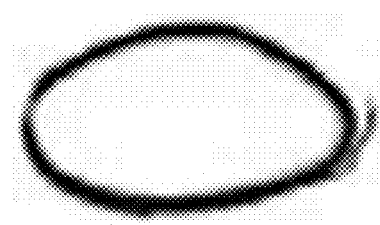

If a stroke's ends merge or join with the stroke itself at the ends, then the stroke makes a new, closed curve (see FIGS. 18G and 18H). In at least some embodiments, after individual curves are checked for possible matching, a check may be made for pair-wise merges. If the start of the stroke merges or joins with one curve and the stroke ends with another curve, a combine operation may be indicated.

FIG. 6 shows a decision tree that may be implemented in at least some embodiments for determining a stroke type. Note the following definitions:

Overlaps: within selection distance d.

Join: ends are close enough together (e.g., within a specified distance) and the curve joining them does not need to flex much (e.g., beyond a specified flex threshold).

End merges: An end of the curve is within a selection distance for a reasonable section of the end of the stroke, and the stroke is roughly parallel to the curve.

End overhangs: The stroke projects to the end of the curve within a reasonable distance (e.g., a specified threshold distance) of where the stroke is close to the curve.

At 600, if it is determined that the stroke does not overlap the curve, then at 602 it is determined if a join is possible or not. If a join is possible, then a join operation is to be performed to join thee stroke to the curve, as indicated at 604. Otherwise, the stroke may be used to form a new curve, as indicated at 606.

At 600, if it is determined that the stroke does overlap the curve, then at 608 it is determined if the entire stroke overlaps the curve. If the entire stroke overlaps the curve, then at 610 it is determined if the stroke overlaps the entire curve. If the stroke overlaps the entire curve, then a blend operation is to be performed, as indicated at 612. If the stroke does not overlap the entire curve, then an oversketch operation is to be performed, as indicated at 614.

At 608, if the entire stroke does not overlap the curve, then at 616 a decision is made based on the number of end merges. If there are no end merges, then the stroke may be used to form a new curve, as indicated at 618. If there is one end merge, then at 620 it is determined if the end overhangs. If the end overhangs, then this is a merge operation, as indicated at 622. Otherwise, this is a partial oversketch start/end operation, as indicated at 624.

At 616, if there are two end merges, then at 626 it is determined if the ends are oriented. If the ends are not oriented, then the stroke may be used to form a new curve, as indicated at 628. If the ends are oriented, then at 630 it is determined if both ends overhang. If both ends overhand, then this is a merge close operation, as indicated at 632. Otherwise, this is an oversketch operation, as indicated at 634.

Match Comparison—Selecting a Curve to Edit

As indicated at 414 of FIG. 4B, a particular one of the curves that is to be edited with the stroke may be selected. In the previous section a stroke is applied to an individual curve. This section discusses determining, out of all of the possibilities, which curve is the best match for this stroke.

In at least some embodiments, in addition to a stroke applied to a single curve, there are other possibilities that may be checked: 1) The stroke forms a new closed curve (check if each end of the stroke merges or joins with the other end). 2) The stroke combines two curves into one. 3) The stroke extends the previous stroke (if the last action was a stroke). This may be used, for example, in creating oversketch strokes from multiple strokes; the strokes are merged together before applying the resulting merged stroke to the curve as an oversketch. 4) The stroke overlaps the previous stroke, e.g., by at least 90%; in this case, the stroke is blended with the previous stroke(s) to create a single stroke (see the section titled Fold-overs and blending).

In at least some embodiments, each valid stroke-curve match may be scored, and a best match (e.g., the match with the lowest score), if any, may be determined. If no match exists, or the best scoring possibility is a closed new stroke, a new curve may be created from the stroke.

At least some embodiments may handle exceptions in the above process. In at least some embodiments, if the stroke can be applied to the last edited curve (or stroke), the stroke is so applied. Next, if the stroke combines two curves, the stroke is used to combine the two curves. At least some embodiments may rule out any curves behind the drawing plane (if it is visible).

After the exceptions are handled, the join with the lowest score may be picked. In at least some embodiments, the score is not used to rule out possibilities, but may be used to control how much smoothing is done to the join.

Figure 7:
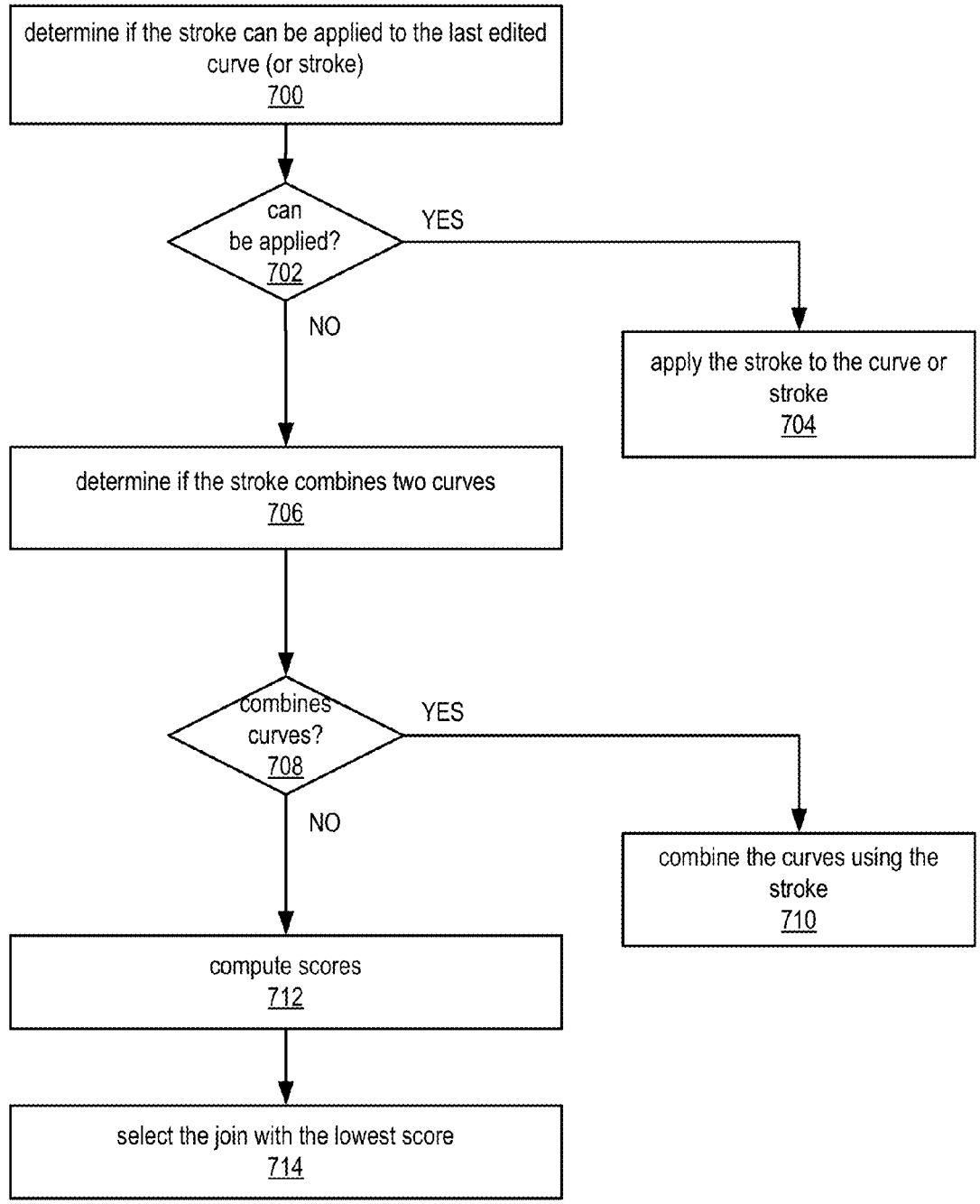
FIG. 7 is a flowchart of a method for selecting a curve to edit with a stroke, according to at least some embodiments.

FIG. 7 is a flowchart of a method for selecting a curve to edit with a stroke, according to at least some embodiments. As indicated at 700, the method determines if the stroke can be applied to the last edited curve (or stroke). At 702, if the stroke can be applied to the last edited curve (or stroke), then the stroke may be applied to the last edited curve (or stroke), as indicated at 704. At 702, if the stroke cannot be applied to the last edited curve (or stroke), then at 706 the method determines if the stroke can be used to combine two curves. At 708, if the stroke can be used to combine two curves, then the two curves are combined using the stroke as indicated at 710. At 708, if the stroke cannot be used to combine two curves, then at 712 the method computes scores for the curves (matches). Note that, in some embodiments, the scores may have been previously computed, e.g. before element 700. As indicated at 714, the method then selects the join with the lowest score. The stroke can then be applied to the selected curve.

In at least some embodiments, to create the score for each match, a combination of the end merge and join information ($q_m$) and the depth values of the projected curve ($q_d$) may be used. In general, matches with curves that do not extend backwards along the view direction at the join point may be preferred. In at least some embodiments, the score for a merge may be:

$$q_m = 0.7 d_a/d + 0.3 \alpha_a/(\tfrac{3}{4}\pi).$$

(See Equation 1). In at least some embodiments, the score for a join may be based on how far apart the ends are. If the ends are relatively close or relatively far apart the score may go up. Specifically (see Equation 2), let:

$$q_a = (\alpha_d/0.2)/4 + 3(\alpha_d/0.3)/4$$

and $$q_l = d_j/(8d).$$

Then there are different scores for $q_m$, depending on how big $q_l$ is:

$$q_l > \tfrac{3}{4} \text{ use } q_m = (1 + (q_l - \tfrac{3}{4})/(\tfrac{1}{4}))q_a \quad (3)$$

$$q_l < \tfrac{1}{4} \text{ use } q_m = (1 + q_l/(\tfrac{1}{4}))q_a \quad (4)$$

$$\tfrac{1}{4} \leq q_l \leq \tfrac{3}{4} \text{ use } q_a \quad (5)$$

In at least some embodiments, the depth score ($q_d$) may be based on how far back the curve is relative to the depth of all curves (the further back, the worse the score). For merges and joins, a term that increases as the depth change increases may be added. Let $Z_m$ and $Z_M$ be the minimum and maximum depth values of the entire 3D curve network, and $z_m$ and $z_M$ be the corresponding depth values for the curve. Then:

$$q_d = \frac{1}{4}\frac{(z_m + z_M)/2 - Z_m}{(Z_M - Z_m)} + \frac{3}{4}\frac{(z_M - z_m)}{(Z_M - Z_m)} \qquad (6)$$

In at least some embodiments, just the first term us used for scoring oversketches. In at least some embodiments, the final score q for a match is:

$$q = \tfrac{1}{4}q_d + \tfrac{3}{4}q_m.$$

In at least some embodiments, if this is a join, not a merge, $q_d$ may be increased, for example doubled, since in general joining with receding curves is undesirable. If there is more than one merge or join scores, the scores may be averaged.

In at least some embodiments, as mentioned above, a check may be performed to determine if the curve is behind the draw plane (and the draw plane is visible); if so, the method does not match with that curve.

Applying the Stroke to the Selected Curve

As indicated at 420 of FIG. 4A, after stroke-curve matching 410 has been performed, the stroke may be applied to the selected curve as determined by the stroke-curve matching 410 process. Once it has been determined what to do with the stroke (see, e.g., the decision tree in FIG. 6) and a best curve has been selected, the stroke needs to be applied to the selected curve according to the determined operation, or alternatively a new curve needs to be created from the stroke. In at least some embodiments, first, depth values may be added to the stroke to create a 3D stroke. Second, the 3D stroke may be cut and pasted into the curve. There may be several goals. A first goal is that the stroke blend smoothly into the curve both in the film plane and in depth. A second goal is that the 3D stroke, when projected back to the film plane, looks the same as the 2D stroke. A third goal is that, where the stroke edits the curve (as opposed to extending it), it only edits it in the direction of the film plane, i.e., looking at the curve from the top (or bottom), it would look the same after the edit.

A conventional technique for merging 2D curves from different views may involve trying to find a 3D point so that, for each pair of corresponding points on the two curves, the 3D point projects to the 2D points. At least some embodiments may employ a similar technique, formulated to account for the fact that one of the curves is already 3D (see, e.g., FIGS. 22A through 22G).

In at least some embodiments, during the stroke processing, the stroke end is projected onto the curve, finding for each stroke point in $s_e$ a matching point on the curve. These overlap regions may then be used to assign depth values to the stroke, interpolating or extrapolating to the remainder of the stroke.

Adding Depth Values to Strokes

Conventional techniques for promoting 2D strokes to 3D typically involve using epipolar constraints to specify depth values along non-planar curves. Embodiments of the 3D sketching technique may instead employ a depth interpolation and extrapolation technique that makes the new stroke consistent in depth with an existing curve. This technique is based on the assumptions that the 3D curve should pass through points that the user drew and that the curve is already a 3D curve. The missing information is obtained by taking existing 3D depth information from existing curve(s) that the stroke was drawn over, instead of trying to match two curves as in the epipolar constraint method. Once the 2D stroke is promoted to 3D using this technique, the user can then change the view and oversketch or continue that curve from the new view.

Figure 8:
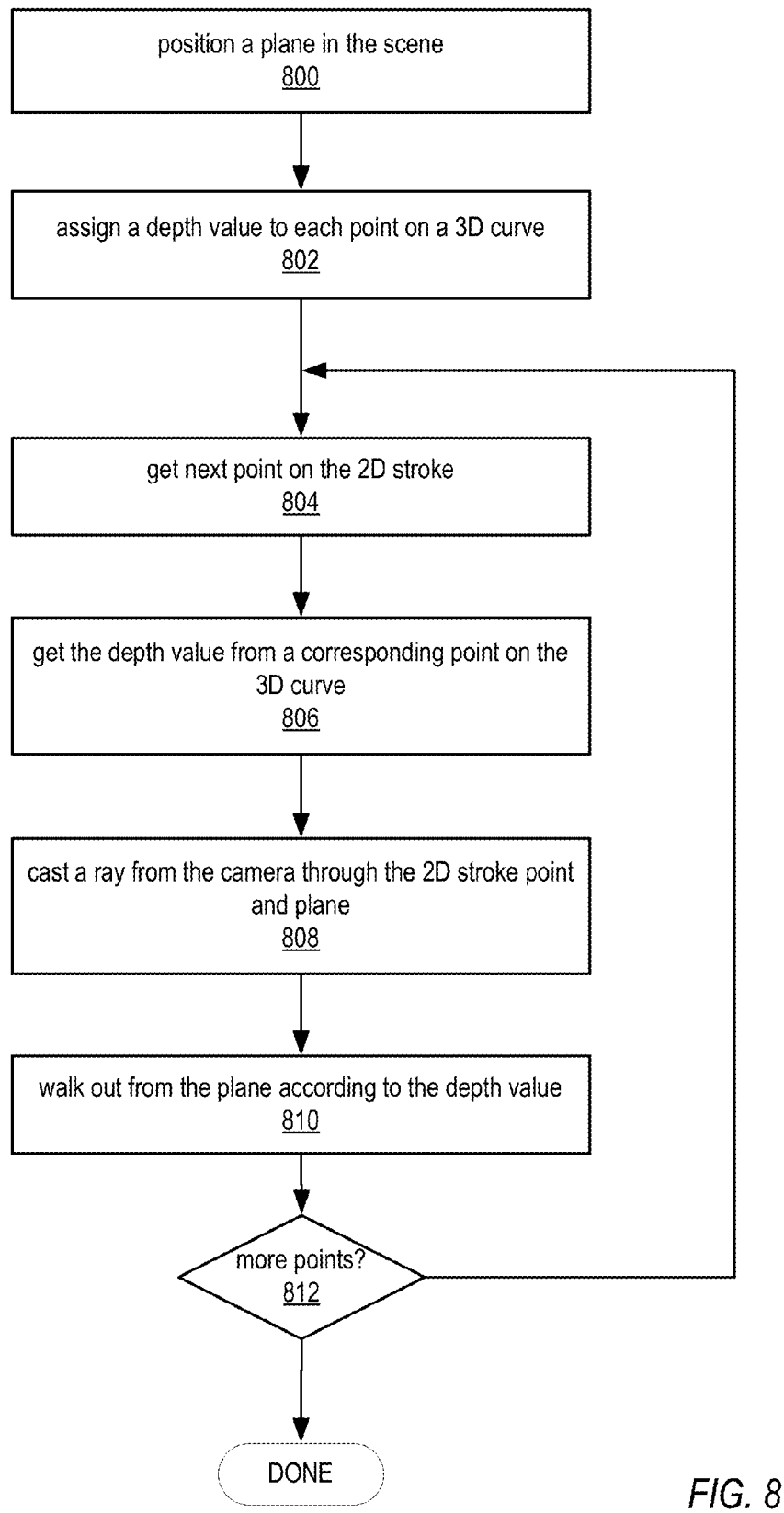
FIG. 8 is a flowchart of a depth interpolation and extrapolation method for adding depth to a 2D stroke, according to at least some embodiments.

FIG. 8 is a flowchart of a depth interpolation and extrapolation method for adding depth to a 2D stroke, according to at least some embodiments. In at least some embodiments, to add depth values to a 2D stroke, the technique may position a plane in the scene (typically the film plane, but it can be the draw plane as well), as indicated at 800. A depth value relative to the plane may be assigned to each point on the 3D curve, as indicated at 802. In at least some embodiment, assigning a depth value to a point on the 3D curve may be performed as follows. A ray is cast from the camera through both the 3D point on the curve and the plane. The (signed) depth value is the distance between those two points. Note that elements 800 and 802 effectively project the 3D curve(s) into 2D (the plane). As indicated at 804, a next point on the 2D stroke is taken. As indicated at 806, the depth value of the corresponding point on the 3D curve is found. As indicated at 808, a ray is cast from the camera through the 2D stroke point and plane. As indicated at 810, a walk out from the plane is performed according to that depth value. Note that elements 804 through 810 effectively match the stroke to a curve and project the 2D stroke into 3D. At 812, if there are more points on the 2D stroke to be processed, the method returns to 804. Otherwise, the method is done.

In at least some embodiments, exactly how depth values are added to the stroke may depend on the match operation. Essentially, in cases where the stroke overlaps or projects onto the curve, at least some embodiments may use the curve's depth values. Where the stroke falls off of the curve, embodiments may either extrapolate the curve's depth values (no draw plane visible) or use zero, essentially placing the stroke on the draw plane (after first moving the draw plane so that it intersects the end of the curve).

To extrapolate the depth values, at least some embodiments may use the average depth change per unit step in the film plane. To establish the correspondence, embodiments may either use the closest point between the stroke and the projected curve, or, if the stroke folds over with respect to the curve, use the arc-length parameterization of the curve. Once the depth values are obtained, embodiments may filter them several times before reconstructing the curve.

Joining Curves

Once the 3D stroke is created by promoting the 2D stroke to 3D, the 3D stroke needs to be merged or joined to the existing curve. At least some embodiments may search for a 3D Hermite curve that blends smoothly with the original curve and the stroke. This may be done in 3D after the 2D stroke has been promoted to 3D to make sure that the join is smooth in all dimensions. The search consists of identifying a merge point, then searching backwards along the curve and forwards along the stroke by some amount. In at least some embodiments, the optimization function is $0.2\alpha_d + 0.8\alpha_t$ for a join, and $0.8\alpha_d + 0.2\alpha_t$ for a merge (see Equation 2). In at least some embodiments, the tangent lengths of the Hermite curve may be set to 1.5× the length of the join, or 0.5× if the curve will "zigzag."

In at least some embodiments, the search region may depend on the selection distance d and how good the merge or join is, scaling from d to 4d for a bad merge score. The starting point for the search may be the middle of the region where they overlap (merge) or the end-point of the curve (join).

Joining Curves Implementation Details

In at least some embodiments, all curves and strokes are stored as lists of 3D or 2D points. Because different devices have different amounts of noise and sampling rates, embodiments may implement a technique for controlling the quality of the samples and their frequency. In at least some embodiments, the user supplies two parameters (set via user interface elements such as sliders): the selection distance d as a number of pixels, and a smoothing rate N. As the strokes are processed, at least some embodiments may perform the following actions: 1) inserting samples to ensure the sampling rate is at least a specified number (e.g., 10) points per screen distance d (in case the pen input "skips"); 2) smoothing some amount based on both N and the quality of the data; and 3) re-sampling to ensure even spacing in 3D.

In at least some embodiments, smoothing may be applied in three places: 1) to the ends of the stroke before computing merge and join information; 2) to the projected depth values while promoting the stroke to 3D; and 3) to a region around the joins. In at least some embodiments, the system applies N rounds of smoothing to the stroke before processing, 2+N rounds of smoothing for the depth, and 1+N+40q, where q is the merge or join score for the join (q is typically in the range 0.01 to 0.1). In at least some embodiments, one round of smoothing moves the point 0.2 towards the average of the neighbors. For the depth smoothing, at least some embodiments construct the 3D points, average, and then re-project the point to the ray, rather than filtering the depth values directly.

At least some embodiments may re-sample the strokes after promoting them to 3D. Distance d is a screen-based sampling rate; by projecting a segment of length d onto a plane perpendicular to the view, centered in the middle of the curves, at least some embodiments may convert d to a 3D absolute distance $d_3$. When re-sampling, at least some embodiments may ensure the samples are spaced $0.1d_3$ apart. Since d reflects, in some sense, how "accurate" the 2D device is, and how close is close enough, it is a good measure for how accurately to sample the data. To speed up the stroke to curve calculations, at least some embodiments may keep a 3D bounding box for each curve. If the stroke lies a distance d outside of the projected bounding box then that curve may be ignored.

3D Sketching

Creating a curve in 3D, especially one that does not lie on a single plane, may be challenging both conceptually and from an interface standpoint. The input is 2D, and the display only shows a 2D projection of the 3D curves, which may create ambiguity in the depth dimension. At least some embodiments may support methods of 3D curve creation that are both controllable (i.e., do not surprise the user) and flexible (i.e., make it possible to create the curve you want). Fundamentally, there are two basic methods for creating 3D curves. A first is to project the 2D curve onto a 3D surface (typically a plane, but any surface works). A second is to sketch the curve from multiple directions and merge the result into a 3D curve that, ideally, projects to each of the drawings. In practice, this is nearly impossible because people do not create consistent drawings. Sketching on surfaces is usually fairly predictable, but often limits the types and complexity of the curves.

Figure 9:
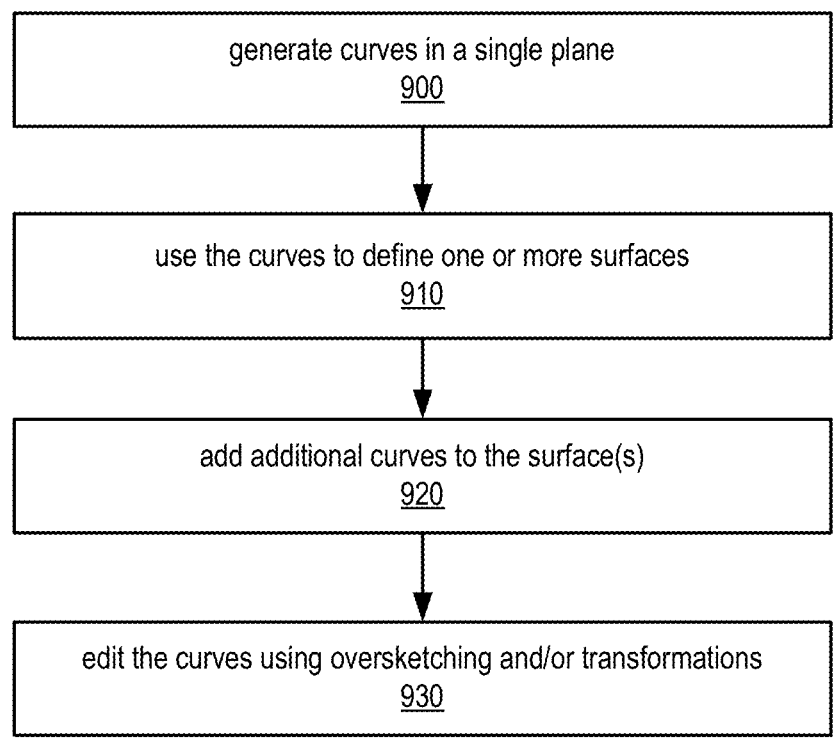
FIG. 9 illustrates a general workflow for 3D sketching according to at least some embodiments.

At least some embodiments may provide one or more methods for quickly creating and placing drawing surfaces, and may use oversketching to edit curves from additional viewpoints (rather than explicitly creating curves from different viewpoints and trying to merge them). At least some embodiments may support standard affine transformations (rotation, scale, translation), both in-plane and out of plane. FIG. 9 illustrates a general workflow for 3D sketching according to at least some embodiments. In at least some embodiments, the general workflow starts by generating one or more curves in a single plane, as indicated at 900. As indicated at 910, the curves may then be used to define one or more surfaces. As indicated at 920, curves that are not in the original plane may be added to the surfaces. As indicated at 930, the curves can then be edited. For example, oversketching may be used to further edit the curves. The user may also use transformations (rotation, scale, translation) to pull curves out of the plane, and then oversketch to get the actual shape they want. See FIGS. 22A through 22G for an example.

Oversketching may be essentially as described in the previous section. Embodiments may use the existing curve to construct depth values relative to a plane (usually the view plane) and then apply those depth values to the stroke. This may preserve what the curve looked like viewed from the up vector of the current view.

Drawing Surfaces

In at least some embodiment, one or more methods for creating drawing surfaces may be employed. In at least some embodiments, the methods may include one or more of: planes (see, e.g., FIGS. 23A through 23C and FIGS. 24A and 24B), extrusion surfaces (see, e.g., FIGS. 24A and 24C), and inflation surfaces (see, e.g., FIGS. 25A through 25C).

In at least some embodiments, a draw plane may be explicitly positioned in the scene. At least some embodiments may use a direct edit approach (grab and move) to position the plane. The plane can be slid back and forth along its normal (squares in the corners), rotated about the plane's two axes (grab middle of the edge and pull towards or away from the plane center or spun about (grab middle of the edge and pull along the edge). Tapping on the hot spots snaps the camera view to the plane. A method of creating curves that may be used in some embodiments is to move the draw plane forward in small increments, drawing cross-sections each time. However, this may be a tedious method for creating surfaces, and in general moving the plane around by hand is painful.

In at least some embodiments, other or additional methods of positioning the draw plane may be supported. For example, a first method is to pick a point on a curve and a direction (tangent, normal, bi-normal at that point). This snaps the plane to that point, with the normal pointing in the second direction. See, e.g., FIGS. 24A and 24B. A second method is to pick two points in the scene (which may be, but are not necessarily, from two different curves). The plane is positioned so that it passes through those points and is as perpendicular as possible to the two tangent directions of the curves. This makes it simple to add cross sections to two silhouette curves. See FIGS. 23A through 23C for an example. Both actions may be performed via the curve menu (e.g., tap on a curve to bring up the curve menu, tap on an Align option, select the direction, OR, tap on the curve to bring up the curve menu, drag from the Align option to the second point), typically but not necessarily followed by a tap on the draw plane controls to align the view with the draw plane, or by a rotate of the camera.

In at least some embodiments, the extrusion and inflation surfaces may be mode-based (the user may explicitly indicate that a surface is being created). In at least some embodiments, the extrusion surface technique works by extruding a curve in a given direction chosen by the user. Once the extrusion surface is displayed, the user can draw as many curves on it as they want, or may click elsewhere to pick another surface. See FIGS. 24A and 24C for an example.

Figure 25A:
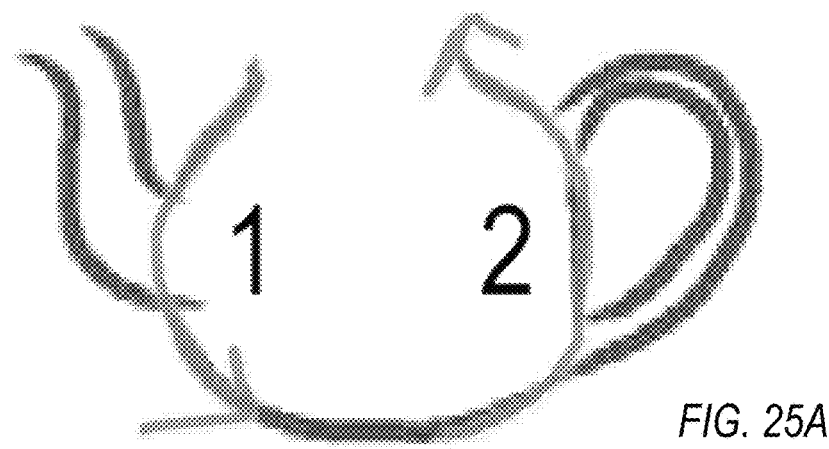
FIGS. 25A through 25C illustrate creating and drawing on an inflation surface, according to at least some embodiments.

In at least some embodiments, the inflation surface technique may be a simplified version of a surface as may be created by inflation-based methods. The inflation surface technique may be based on the contour lines drawn by artists. For example, as shown in FIG. 25A, the user strokes where they want the left side to be (1), and then the right side (2), and then the user creates a surface that joins those two curves (FIG. 25B), bulging towards the viewer in the middle. Note that, while there may need to be curves under part of the left-right strokes, the curves may not need to correspond to specific curves in the scene.

In creating the inflation surface, at least some embodiments may build a temporary 3D curve for each stroke, and then join pairs of points on the curves with a half-circle. In at least some embodiments, an arc-length parameterization technique may be used to determine which pairs of points to use. Note that other methods may be used to determine which pairs of points to use in some embodiments. In at least some embodiments, the radius of the half-circle may be one-half the distance between the two points.

In at least some embodiments, the temporary curves may be built by fitting a curve to the curve points that lie under the mouse. For each stroke point, a ray may be cast into the scene and, the closest curve point (sorting by depth in the case of close points) may be found. The selection may be "fat" (within 2d). These 3D points may be strung into a curve and smoothed, skipping any stroke points that do not intersect any curves.

Menus

The 3D sketching technique interface (see, e.g., GUI 108 of FIG. 1 and FIGS. 30A through 30D) may be designed and implemented to lessen or minimize the amount of time spent doing non-sketching tasks (menu selection, mode changes, mouse clicks, etc). At least some embodiments may employ a variation of in-screen pie-menus for changing the behavior of the last stroke, curve editing, and camera control (see, e.g., FIGS. 19B, 20A, and 30B). At least some embodiments may provide a stroke menu invoked from selection circles at the end of the last stroke, a curve menu invoked by clicking anywhere on a curve (which also selects the curve), and a camera menu, invoked by clicking on the background. Unlike traditional pie menus, embodiments may combine menu selection with Cross-Y style selection to minimize mouse clicks. For example, as shown in FIGS. 20A through 20D, in at least some embodiments, to select a region of a curve and drag it, the user 1) clicks on the curve to bring up the curve menu (FIG. 20A); 2) moves the cursor down on the drag option (FIG. 20B); 3) drags over the part of the curve to drag (FIG. 20B); and then 4) releases the mouse. At this point, the user may drag the curve selection using a drag icon or tool (FIGS. 20C and 20D). In at least some embodiments, moving the cursor down on the top of the drag icon may produce an in-out drag, while moving the cursor down elsewhere may perform an in-plane drag. This is a total of three clicks for selecting a curve, selecting the region on the curve to edit, and whether the user wants to edit in the plane or out of plane.

In at least some embodiments, one or more of several menu selection and edit techniques may be supported; the different techniques, however, may result in different behaviors. In some embodiments, the user may simply pass the cursor out of the menu over the desired selection. This typically does the most global option, such as centering the camera on all the curves or snapping the camera to the closest view. In some embodiments, the user may click on the menu option. This can (optionally) bring up additional controls, such as selection arrows. In some embodiments, the user may perform a mouse down and drag. This may be used for direct manipulation of the camera and for selection, for example selecting which curve to center the camera on.

In at least some embodiments, another action, which is similar but not identical to a lasso technique, may be supported. In this technique, the user moves the cursor down and drags over a set of curves, then releases the mouse button close to the original menu item. This selects all of the curves the mouse crossed over, not just the latest one.

Example User Interface Elements and Operations

Figure 19A:
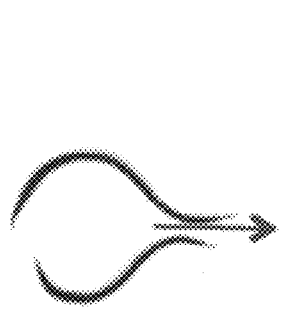
FIGS. 19A through 19C illustrate correcting a stroke-curve operation, according to at least some embodiments.
Figure 19B:
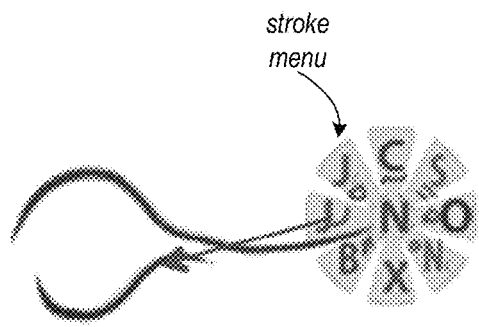
Figure 19C:
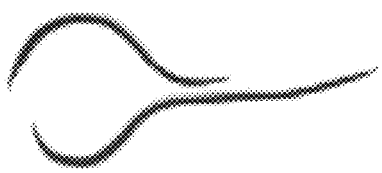

As previously noted, the system determines which curve (if any) a newly added stroke belongs to. In at least some embodiments, the system may favor adding a stroke to a curve the user is currently working on. If the system gets it wrong, the user can override that decision or delete the stroke, for example using a pop-up menu invoked by tapping at the end of the stroke. FIGS. 19A through 19C illustrate correcting a stroke-curve operation, according to at least some embodiments. In FIG. 19A, the user draws a stroke that the system assigned to the wrong curve. In FIG. 19B, the user overrides that choice by tapping on the end of the stroke, which brings up the stroke menu. The user can pen-down on or otherwise select a "join" option of the menu and draw to the desired curve, as illustrated in FIG. 19B, to produce the corrected results shown in FIG. 19C. In the example menu shown in FIG. 19B, the menu options are, from top clock-wise: Combine two curves, Smooth the join, Oversketch, New closed curve, Delete (X), Back-and-forth scratch, Join, and Join and close. The center menu option is for New curve.

Figure 20A:
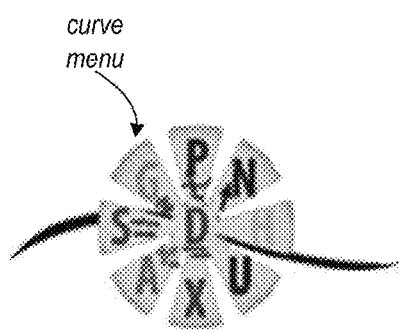
FIGS. 20A through 20D illustrate drag operations, according to at least some embodiments.
Figure 20B:
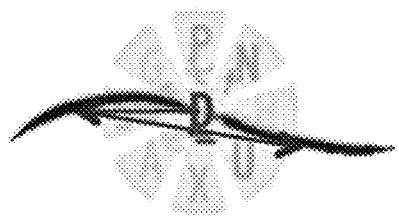
Figure 20C:
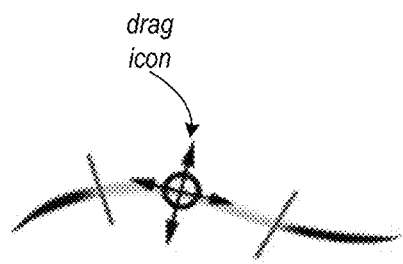
Figure 20D:
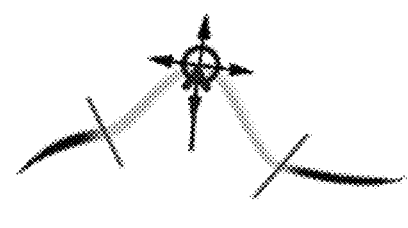

FIGS. 20A through 20D illustrate drag operations, according to at least some embodiments. In at least some embodiments, to drag a part of a curve, the user selects the curve (e.g., with one click), as shown in FIG. 20A. A curve popup menu is displayed. The user then selects a drag option and the region for the drag on the curve (pen-down in option, drag over curve region), as shown in FIG. 20B. A drag icon may then be displayed, as shown in FIG. 20C. The user can then grab and drag the curve in the plane, or in and out of the plane (e.g., by clicking on the top or bottom of the drag icon), as shown in FIG. 20D.

FIGS. 21A through 21F illustrate translating (FIGS. 21A and 21B), scaling (FIGS. 21C and 21D), and rotating (FIGS. 21E and 21F) a curve as invoked from a menu such as the curve menu shown in FIG. 20A, with the specific operation determined by where the cursor is with respect to the drag icon (circle) and curve (above or below).

Figure 22A:
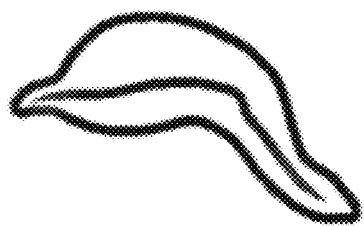
FIGS. 22A through 22G illustrate using a drag plus oversketching from different views to create a 3D, non-planar curve, according to at least some embodiments.
Figure 22B:
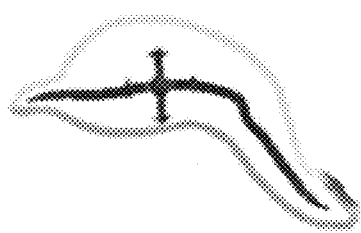
Figure 22C:
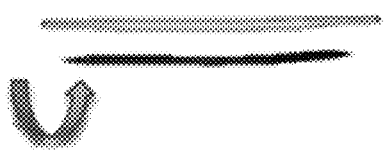
Figure 22D:
Figure 22E:
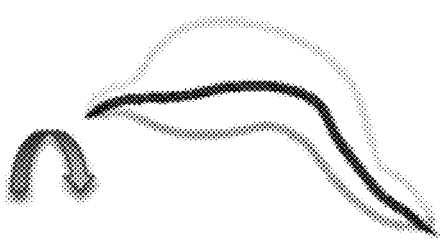
Figure 22F:
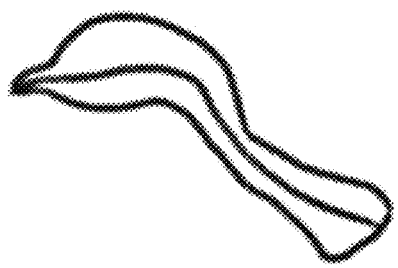
Figure 22G:
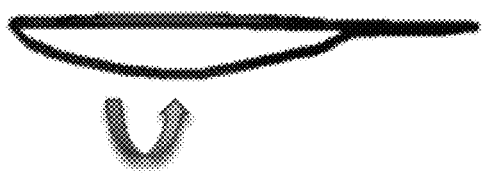

FIGS. 22A through 22G illustrate using a drag plus oversketching from different views to create a 3D, non-planar curve for the side of a fish, according to at least some embodiments. FIG. 22A shows curves in a plane. FIG. 22B shows a drag Z operation. In FIG. 22C, the camera is rotated 90 degrees. In FIG. 22D, an oversketch operation is performed. In FIG. 22E, the camera is rotated back 90 degrees. In FIG. 22F, an oversketch operation is performed. In FIG. 22G, the camera is again rotated 90 degrees.

Figure 23A:
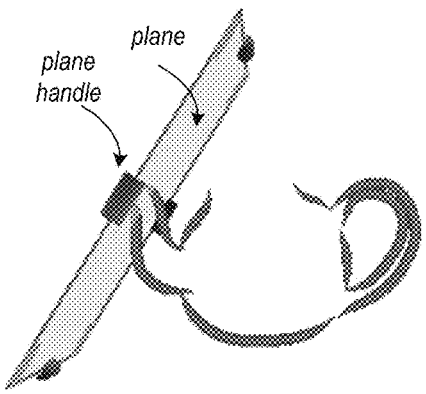
FIGS. 23A through 23C illustrate creating a cross-section curve by using the curve menu to define a plane, according to at least some embodiments.
Figures 23B, 23C:
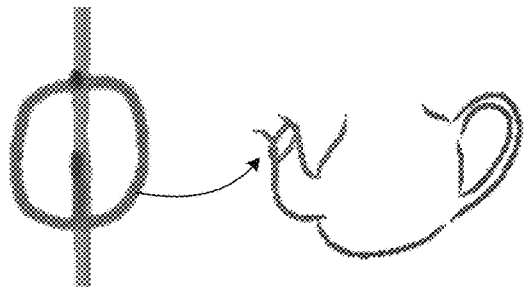

FIGS. 23A through 23C illustrate creating a cross-section curve by using the curve menu to define a plane, according to at least some embodiments. In this example, the user wants to create a cross-section of the spout of the teapot. To create the plane as shown in FIG. 23A, the user clicks on a first curve, picks an option from the curve menu, and then drags to a second curve. The user can then click on the middle plane handle to rotate the plane and look down the plane normal and draw the cross-section, as shown in FIG. 23B. Results are shown in FIG. 23C.

Figure 24A:
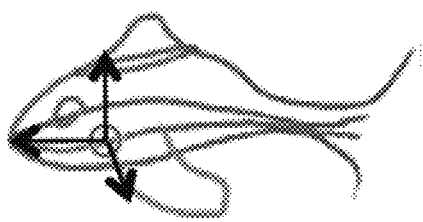
FIGS. 24A through 24C illustrate creating a drawing plane or extrusion surface, according to at least some embodiments.
Figure 24B:
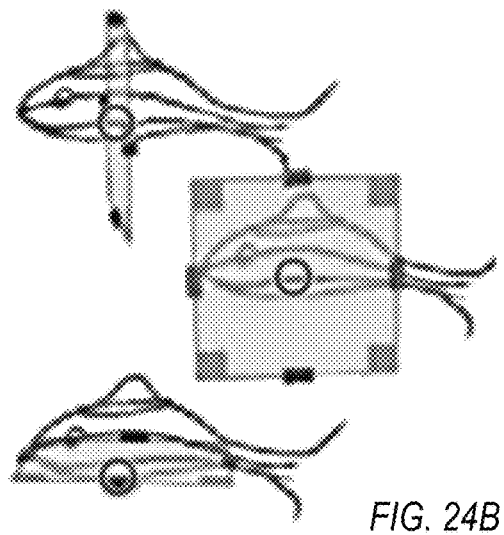
Figure 24C:
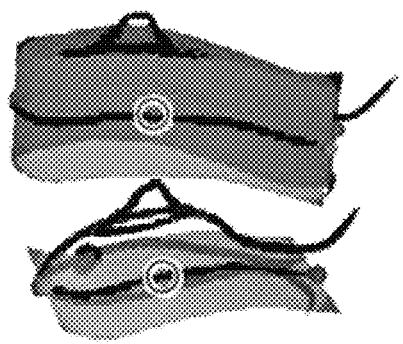

The user can also create a drawing plane or extrusion surface, as illustrated in FIGS. 24A through 24C. In FIG. 24A, the user picks a direction as shown by the arrows. In FIG. 24B, a drawing plane is created in the chosen direction. In FIG. 24C, an extrusion surface is created in the chosen direction.

Figure 25B:
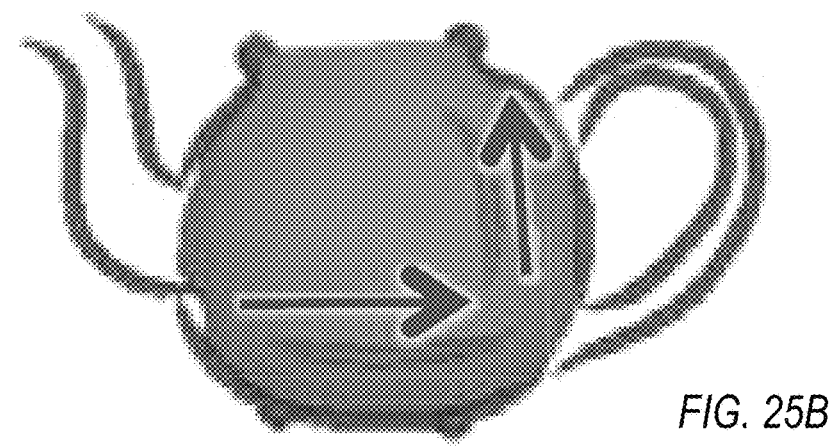
Figure 25C:
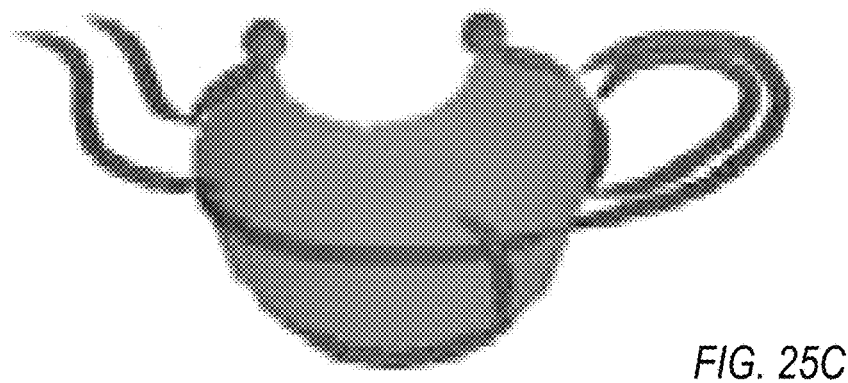

FIGS. 25A through 25C illustrate creating and drawing on an inflation surface, according to at least some embodiments. In FIG. 25A, the user specifies a surface In FIG. 25B, the user draws curves on the surface. FIG. 25C shows results.

Visuals and Interface Elements

In at least some embodiments, three distinct visual styles may be provided, one each for 2D drawing, 3D curve editing, and 3D curve network normalization. The 2D drawing style is simply view-facing strokes with a texture. In at least some embodiments, the 3D curve editing style may have both warm-cool shading (the curves are rendered as tubes) and depth-based shading. In at least some embodiments, the normalization stage may use ribbons—basically the top part of a very wide tube passing through the curve and oriented with the tangent plane. A rendering style that may be used here is to use different colors, for example yellow on the front, purple on the back, with a bit of warm-cool shading.

To provide a sense of 3D, in at least some embodiments a shadow box may be used; the shadow box may, for example, be displayed as three sides of a box centered on the current selection. The shadow box provides some depth cues (the curve shadows are drawn on the left and bottom sides) and spacing cues (through grids on the sides), and spatial cues on the location of the drawing plane. At least some embodiments may also use the shadow box to provide in-screen control of the camera (separate from the camera menu). In least some embodiments, the user can do axis-aligned and trackball rotation using the hotspots on the edges and corners, as well as zoom (lower left). In least some embodiments, there are two hotspots (lower left and lower right) for snapping the draw plane to the center of the box and drawing or undrawing the draw plane.

FIGS. 26A through 26C graphically illustrate a shadow box, according to at least some embodiments. The shadow box shown in FIG. 26A provides 3D visualization cues (shadows), camera controls, and 3D affine transformations (FIGS. 26B and 26C). The 3D versions are identical to the 2D, except they are constrained to the view and right directions (floor) and view and up (right wall). FIG. 26B shows a 3D drag operation, while FIG. 26C shows a 3D rotate operation.

Curve Networks and Surfacing

Moving from 3D curves to a curve network that can be used for surface building may, for example, involve ensuring curves actually intersect where they look like they should and orienting the curves so that their normals point "out" of the surface. At least some embodiments may provide both visuals (e.g., a ribbon drawing that helps to visualize the curve orientation) and tools (e.g., tools for finding intersections, snapping the intersections, explicit normal control, etc.) to help the user in creating a valid curve network. Note that this section is stand-alone, in that any set of curves (including those from other sources than the 3D sketching technique described herein) can be used as a starting point.

Snapping and Intersections

In at least some embodiments, curves are considered snapped if they share a point in common (similarly, a curve is closed if the first and last points are the same). In at least some embodiments, curves may be snapped by dragging (typically, using as big a drag region as possible) the two closest points together to their averaged point. (A similar method may be provided for snapping multiple curves.) In least some embodiments, the snapped curves may have a pin constraint applied; if a snapped curve has a smooth, drag or other operation applied to it that does not change the pin constraint too much, then the constraint may be re-applied, only moving the un-constrained curve(s). In least some embodiments, the user may explicitly snap two curves by selecting one curve and then dragging to select the other point (the system picks the two closest points), or alternatively the user can use the global tool to find all possible constraints and simply snap on the ones they wish to.

In at least some embodiments, the global tool looks for all possible intersections, and presents fixed intersections (for example, indicated as green spheres) and potential intersections (for example, indicated as purple spheres) connected, for example, by a cylinder. Clicking on the cylinder snaps the curves together, or alternatively the user can simply have all the marked curves snapped together at once.

In least some embodiments, a global search algorithm may be implemented in which, given a search distance $d_m$, a set of points are extracted that are spaced $0.5d_m$ apart on the curves. (This could be all of the points making up the curves, but is typically some fraction thereof). The algorithm then iterates, finding and merging intersections. First, for each of these points, the algorithm looks for any point on any curve that is within $d_m$ of the point. Typically, there will be a connected region on a curve that is within that distance. The algorithm takes the closest point of that region and removes the other points from consideration. The algorithm determines if any of these found intersections are the same, and merges them if so. The algorithm then repeats with only the found intersection points.

In at least some embodiments, to ensure that pin constraints are handled correctly, any point that is pinned may be automatically added to the initial set of points. If a possible intersection actually has a shared pair of points, which is the snap point regardless of how many other points are close by. I.e., the average is not used in this case; instead, the location of the shared points is used.

Normal Constraints and Normal Directions

A 3D curve has a natural Frenet frame that defines the tangent, normal, and bi-normal. Unfortunately, Frenet frames are notoriously unstable (and undefined in linear regions). Rather than use the Frenet frame directly to define the normal and bi-normal, at least some embodiments may use a technique to guess or estimate as to what the eventual surface tangent plane will be, and may set the normal based on the guess. In at least some embodiments, the ribbon drawing reflects this, providing feedback on what the eventual surface tangent should be.

In at least some embodiments, the user can explicitly set one or more normals on the curve, and the system may then spherically interpolate those normals along the curve. Normal constraints may be automatically created when two curves are snapped together. In this case, at least some embodiments may estimate a normal based on fitting a plane to the curve points near their intersection (this may work better than taking the cross product of the tangents, since that can be noisy). The user can then click to change the normal direction or directly edit it by dragging.

For closed curves, at least some embodiments may estimate the normal direction by taking a ray from the centroid of the curve out through the curve; this may only be applied at places where the ray is roughly perpendicular to the curve tangent direction. Interpolation may be performed between these places.

For planar curves, at least some embodiments may put the normal in the plane. For non-planar curves, at least some embodiments may fit a plane to the points.

Figures 27A, 27B:
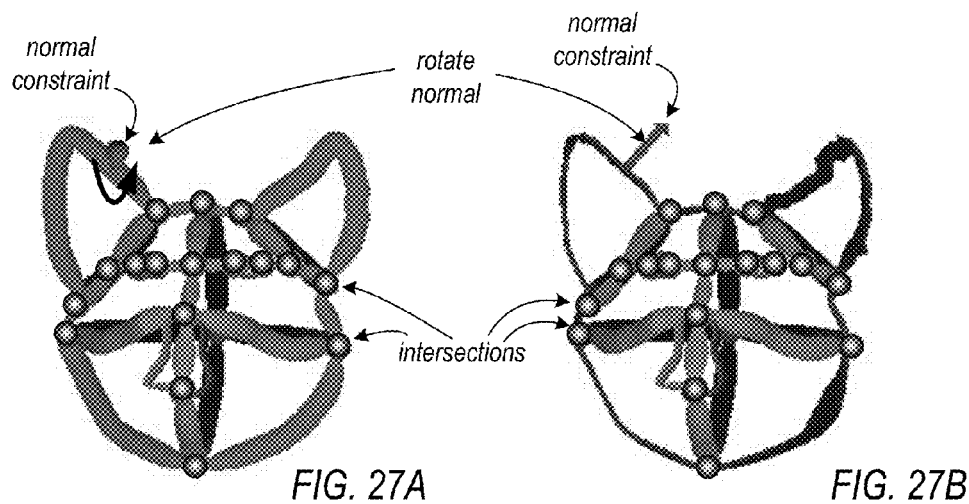
FIGS. 27A-27B illustrate curve networks and surfacing, according to at least some embodiments.
Figure 28A:
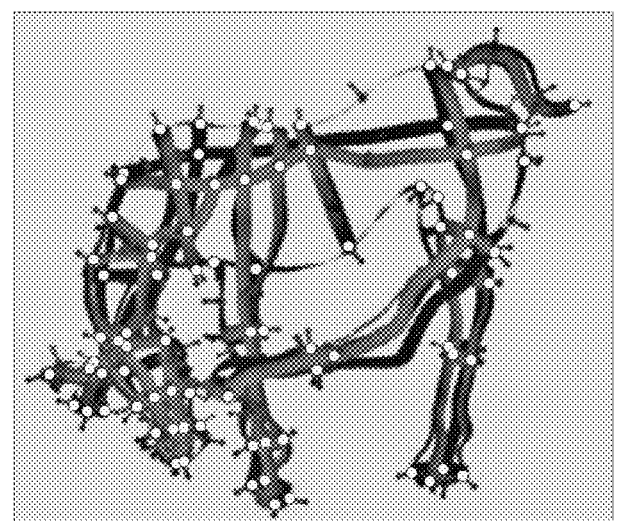
FIGS. 28A-28B further illustrate curve networks and surfacing, according to at least some embodiments.
Figure 28B:
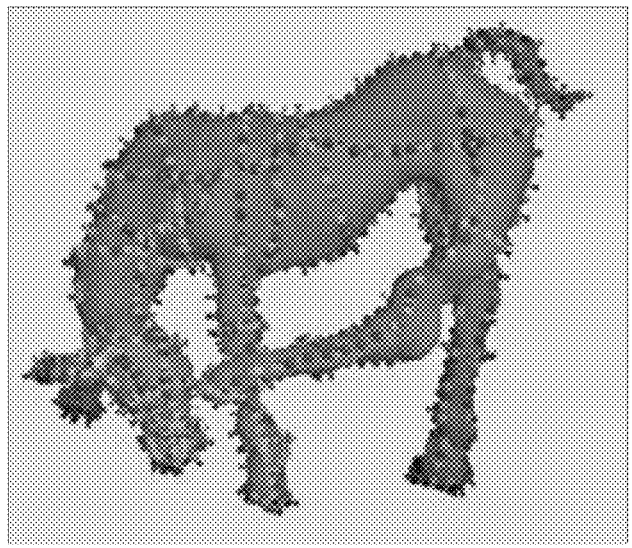

FIGS. 27A-27B and FIGS. 28A-28B graphically illustrate curve networks and surfacing, according to at least some embodiments. In FIGS. 27A and 27B, the dots indicate snapped intersections. The user can place a normal constraint on s curve (in this example the ear) and rotate the normal to change the local surface normal, as shown in FIGS. 27A and 27B. In FIG. 28A, the white dots are snapped intersections with normal constraints, and the arrows without dots are additional normal constraints. FIG. 28B shows all of the point (light gray), tangent (dark gray) and normal (arrow) constraints used to generate an RBF surface.

FIGS. 29A through 29F show several examples of 3D objects created with an embodiment of the 3D sketching system described herein. In FIGS. 29C through 29F, the surfaces were made using a Hermite RBF formulation.

Example Implementations

FIGS. 30A through 30D illustrate an example device and user interface for embodiments of a 3D sketching technique as described herein. In this example embodiment, the user interface to the 3D sketching technique may be displayed on a touch-enabled screen of a touch-enabled device 1800 such as a pad or tablet device. In some embodiments, the user interface may include a canvas 1810 and controls 1820. Controls 1980 may include one or more user interface elements such as slider bars, menus, buttons, alphanumeric entry boxes, and so on via which the user can view and/or specify one or more parameters of the 3D sketching technique, such as the selection distance d and a smoothing rate N. Note that other parameters and thresholds than d and N may also be controlled by the user in some embodiments.

In this example embodiment, the user may interact with the user interface using a pen or stylus to perform the various 2D and 3D sketching operations and other operations as described herein. Note, however, that in some embodiments the operations as described herein may instead or in addition be performed using one or more digits via a touch- or multitouch-enabled screen or pad, or performed using a cursor control device such as a mouse or trackball.

Figure 30A:
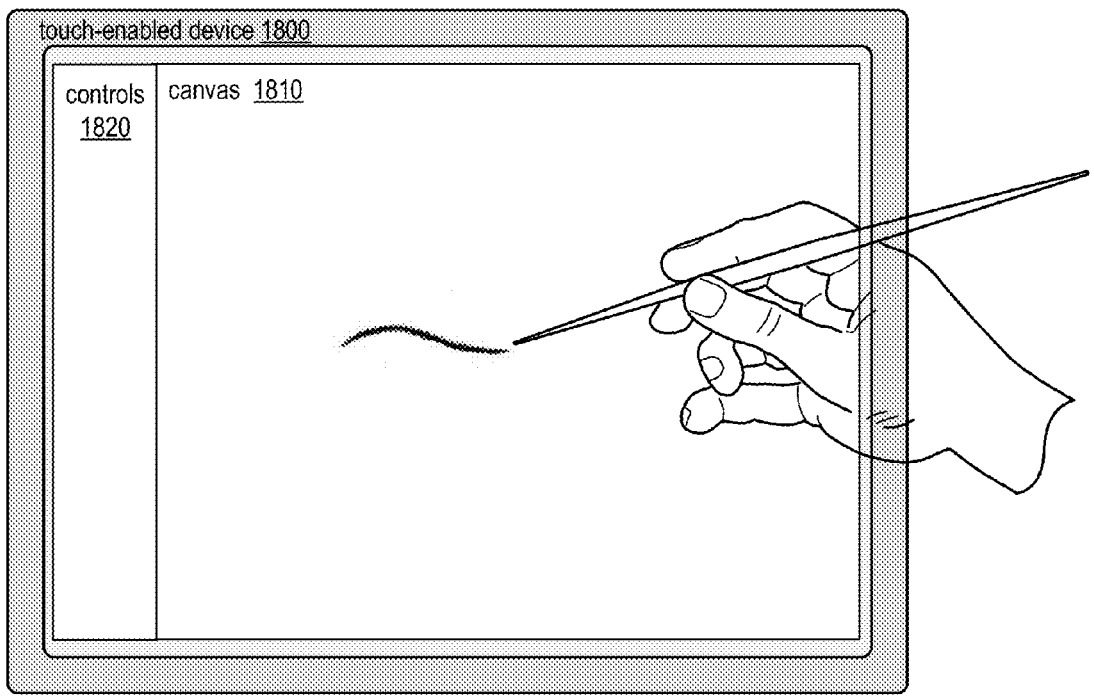
FIGS. 30A through 30D illustrate an example device and user interface for embodiments of a 3D sketching technique as described herein.
Figure 30B:
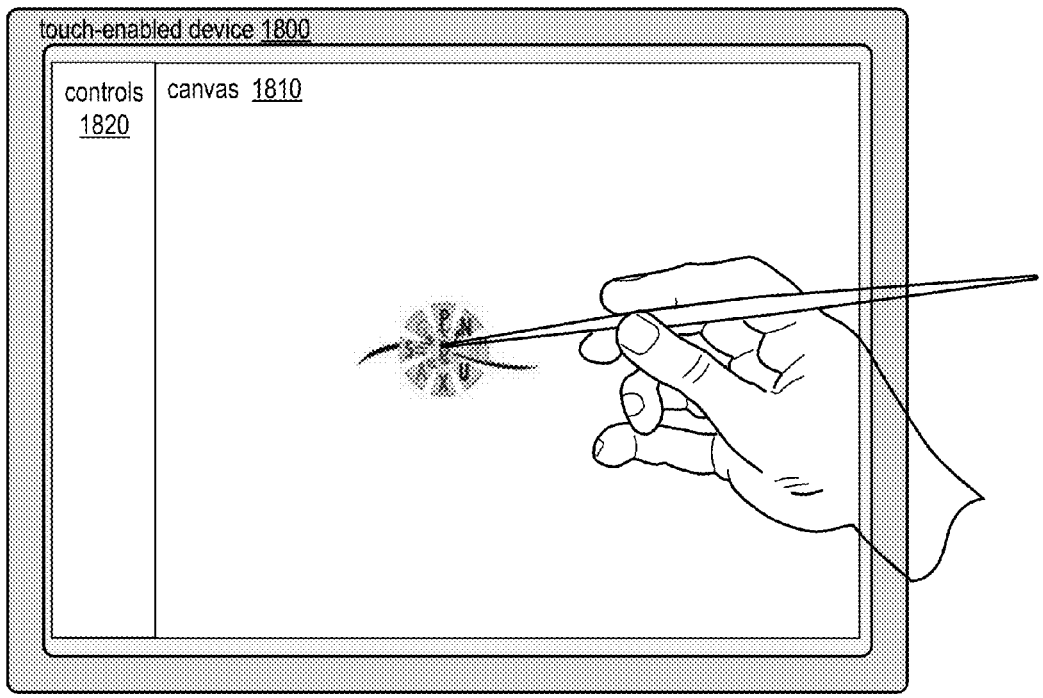
Figure 30C:
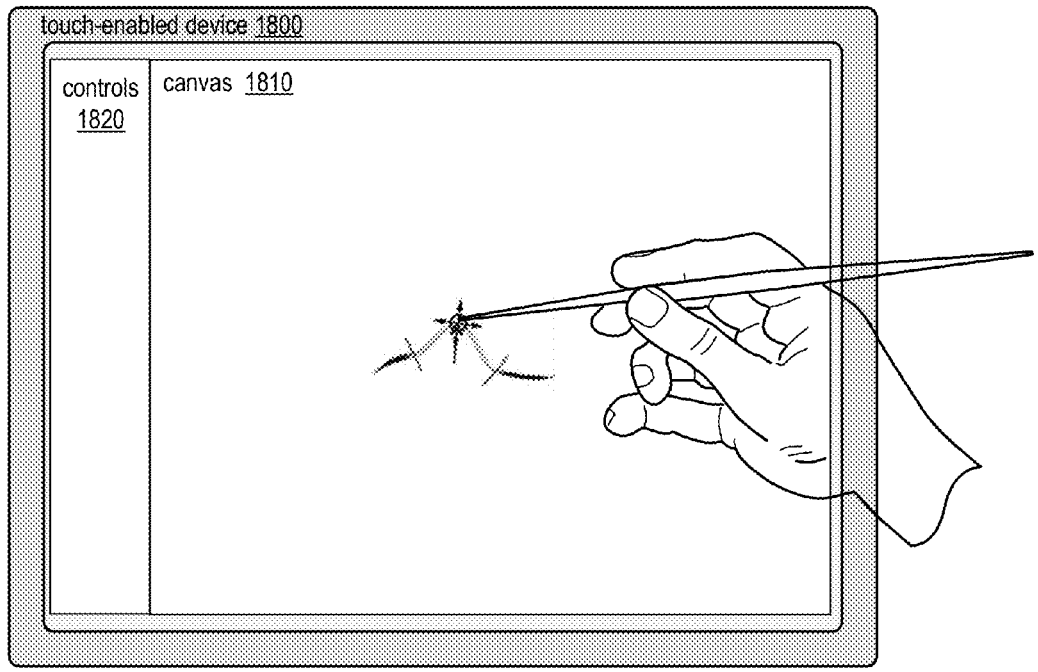

In FIG. 30A, the user has drawn one or more strokes in the canvas 1810 using the pen or stylus to create a simple curve. In FIG. 30B, the user has selected the curve, e.g. by clicking once on the curve with the pen. In response, a curve menu as illustrated in FIG. 20A is displayed. In FIG. 30C, after selecting a drag option and a region for the drag on the curve (see FIG. 20B), the user can use the pen to grab and drag the curve in the plane via a drag icon displayed on the canvas 1810.

Figure 30D:
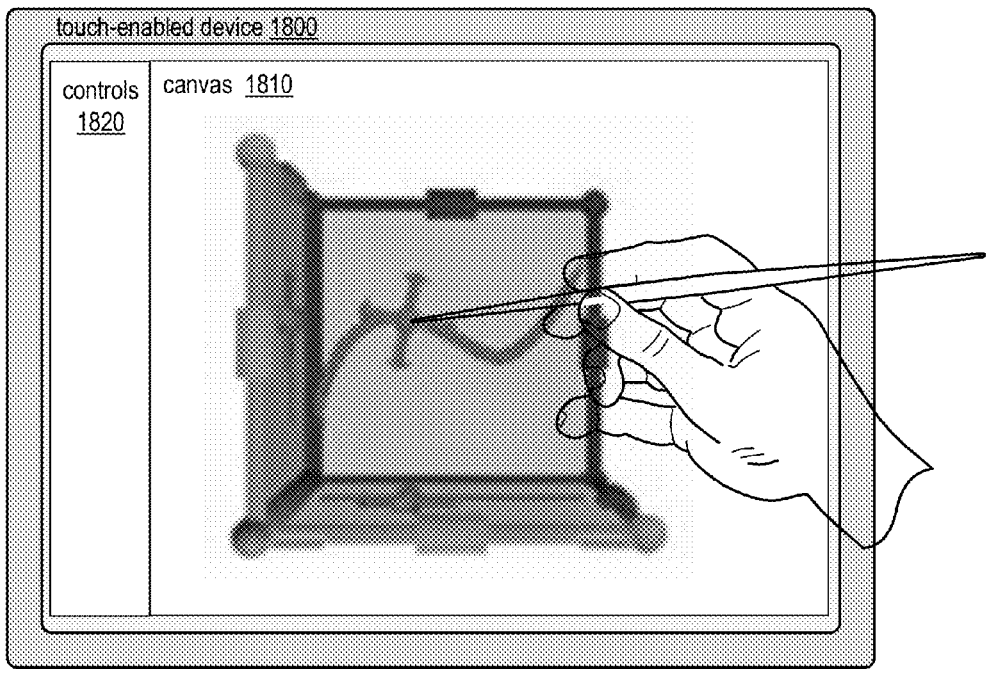

FIG. 30D shows a shadow box displayed on the canvas 1810. The shadow box is described above in reference to FIGS. 26A through 26C. FIG. 30D shows the user performing a 3D drag operation using the pen.

Some embodiments may include a means for performing a 3D sketching technique or one or more of the components thereof. For example, a 3D sketching module may receive input to perform one or more of the various tasks or functions in the 2D drawing and analysis phase, the 3D curve drawing and editing phase, and the curve network creation and surfacing phase of the 3D sketching technique as described herein. The 3D sketching module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform tasks or functions of the 2D drawing and analysis phase, the 3D curve drawing and editing phase, and the curve network creation and surfacing phase of the 3D sketching technique according to received input as described herein. Other embodiments of the 3D sketching module may be at least partially implemented by hardware circuitry and/or firmware stored, for example, in a non-volatile memory.

Figure 31:
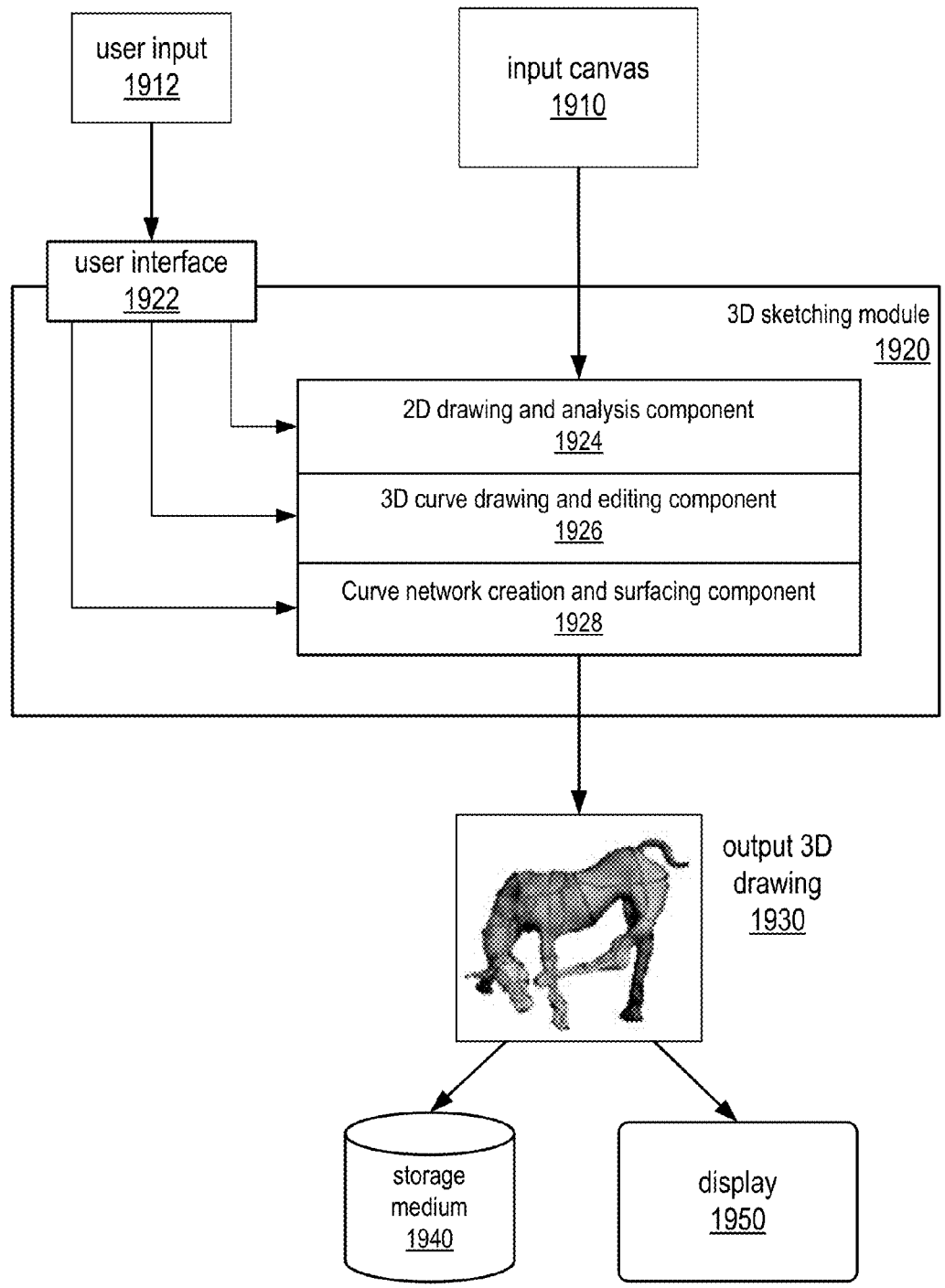
FIG. 31 illustrates a module that may implement a 3D sketching technique, according to some embodiments.

FIG. 31 illustrates a 3D sketching module that may implement an embodiment of the 3D sketching technique as described above. Module 1920 may, for example, implement one or more of a 2D drawing and analysis component 1924, a 3D curve drawing and editing component 1926, and a curve network creation and surfacing component 1928. FIG. 32 illustrates an example computer system on which embodiments of module 1920 may be implemented. Module 1920 may receive as input, or may alternatively create, a digital canvas 1910. Module 1920 may receive user input 1912, via user interface 1922. An example user interface is illustrated in FIGS. 30A through 30D. Module 1920 performs one or more of the various tasks, methods, or functions as described above for 2D drawing and analysis, 3D curve drawing and editing, and curve network creation and surfacing, according to the user input 1912 received via user interface 1922. The user may continue to provide additional input 1912 via user interface 1922 to proceed through the 2D drawing and analysis phase, the 3D curve drawing and editing phase, and the curve network creation and surfacing phase of the 3D sketching technique as described above (see, e.g., FIGS. 1 through 9). Module 1920 generates as output a 3D drawing or image 1930. Output 1930 may, for example, be stored to a storage medium 1940, such as system memory, a disk drive, DVD, CD, etc., displayed to a display device 1950, and/or passed to another module or back to module 1920 for additional processing.

In some embodiments, module 1920 may provide a user interface 1922 via which a user may interact with the module 1920, for example to perform one or more of the various tasks, methods, or functions as described above for 2D drawing and analysis, 3D curve drawing and editing, and curve network creation and surfacing. In some embodiments, the user interface may provide user interface elements as described herein for performing 2D drawing and analysis, 3D curve drawing and editing, and curve network creation and surfacing. In at least some embodiments, user interface 1922 may include different interfaces and/or user interface elements to support user interactions at each of the three levels or phases (2D drawing and analysis, 3D curve drawing and editing, and curve network creation and surfacing) of the 3D sketching technique. An example user interface is illustrated in FIGS. 30A through 30D.

Example System

Embodiments of a 3D sketching module and/or of the 3D sketching techniques as described herein may be executed on one or more computer systems, which may interact with various other devices. One such computer system is illustrated by FIG. 32. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, a smart phone, a pad or tablet, video game console, handheld video game device, application server, storage device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, display(s) 2080, and touch- or multi-touch enabled device(s) 2090, such as a screen, pad, or tablet via which input may be received via a digit or digits and/or a pen or stylus. In some embodiments, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processor(s) 2010 may be any suitable processor capable of executing instructions. For example, in various embodiments, processor(s) 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may be configured to store program instructions and/or data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a 3D sketching module are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a computer-accessible medium may include storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may be configured to coordinate I/O traffic between processor(s) 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor(s) 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor(s) 2010.

Network interface 2040 may be configured to allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 32, memory 2020 may include program instructions 2025, configured to implement embodiments of a 3D sketching module as described herein, and data storage 2035, comprising various data accessible by program instructions 2025. In one embodiment, program instructions 2025 may include software elements of embodiments of a 3D sketching module as illustrated in the above Figures. Data storage 2035 may include data that may be used in embodiments. In other embodiments, other or different software elements and data may be included.

Those skilled in the art will appreciate that computer system 2000 is merely illustrative and is not intended to limit the scope of a 3D sketching module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   generating a three-dimensional (3D) sketch comprising a plurality of three-dimensional (3D) curves according to two-dimensional (2D) input, wherein said generating comprises iteratively performing;
   obtaining input indicating a 2D stroke;
   projecting one or more 3D curves onto a plane to create 2D curves;
   analyzing the 2D stroke according to the 2D curves to determine if the 2D stroke input can be applied to the one or more 3D curves;
   if the 2D stroke can be applied to the one or more 3D curves, applying the 2D stroke to the one or more 3D curves; and
   if the 2D stroke cannot be applied to the one or more 3D curves, generating a new 3D curve from the 2D stroke input.

2. The method as recited in claim 1, wherein said analyzing comprises determining information indicating how each end of the 2D stroke interacts with a respective 3D curve.

3. The method as recited in claim 2, wherein said analyzing further determines one of a plurality of stroke types for the 2D stroke according to the determined information indicating how each end of the 2D stroke interacts with a respective 3D curve, wherein each stroke type indicates a particular operation for applying the 2D stroke to the one or more 3D curves.

4. The method as recited in claim 3, wherein the plurality of stroke types include:
   an oversketch stroke type indicating that the 2D stroke replaces a portion of a respective 3D curve;
   an extend stroke type indicating that the 2D stroke extends a respective 3D curve;
   a partial oversketch stroke type indicating that the 2D stroke is to be merged with one or more other 2D strokes to replace a portion of a respective 3D curve; or
   an extend and close stroke type indicating that the 2D stroke closes a respective 3D curve.

5. The method as recited in claim 1, wherein said applying the 2D stroke to the one or more 3D curves comprises performing one of:
   merging the 2D stroke to an end of a respective 3D curve;
   joining the 2D stroke to an end of a respective 3D curve by bridging a gap between an end of the 2D stroke and the end of the respective 3D curve;
   replacing a portion of a respective 3D curve according to the 2D curve;
   merging the 2D stroke with one or more other 2D strokes to replace a portion of a respective 3D curve;
   merging two 3D curves according to the 2D stroke; or
   closing a respective 3D curve according to the 2D stroke.

6. The method as recited in claim 1, where said analyzing determines a plurality of 3D curves to which the 2D stroke can be applied, and wherein the method further comprises selecting the one or more curves from among the plurality of 3D curves as a best match for the 2D stroke.

7. The method as recited in claim 1, wherein said applying the 2D stroke to the one or more 3D curves comprises:
   adding depth information to the 2D stroke to promote the stroke to 3D; and
   applying the 3D stroke to the one or more 3D curves.

8. The method as recited in claim 7, wherein said adding depth information to the 2D stroke to promote the stroke to 3D is performed according to a depth interpolation and extrapolation technique that obtains the depth information for the 2D stroke from depth information of an existing 3D curve to make the stroke consistent in depth with the existing 3D curve.

9. The method as recited in claim 1, further comprising:
generating a curve network from the plurality of 3D curves; and
applying a surface to the curve network.

10. The method as recited in claim 9, wherein said generating a curve network from the plurality of 3D curves comprises:
snapping two or more of the plurality of 3D curves together at one or more intersection points; and
adding one or more surface normals to the plurality of 3D curves.

11. The method as recited in claim 1, further comprising:
defining one or more temporary surfaces according to at least one 3D curve; and
adding one or more new 3D curves according to the one or more temporary surfaces.

12. The method as recited in claim 1, further comprising performing a rotation operation, scale operation, translation operation, or drag operation on at least one 3D curve according to input.

13. The method of claim 1, wherein the analyzing includes determining if the 2D stroke can be applied to a previously analyzed 3D curves.

14. A system, comprising:
at least one processor; and
a memory comprising program instructions, wherein the program instructions are executable by the at least one processor to generate a three-dimensional (3D) sketch comprising a plurality of three-dimensional (3D) curves according to two-dimensional (2D) input, wherein, to generate the 3D sketch, the program instructions are executable by the at least one processor to:
obtain input indicating a 2D stroke;
project one or more 3D curves onto a plane to create 2D curves;
analyze the 2D stroke according to the 2D curves to determine if the 2D stroke input can be applied to the one or more 3D curves;
if the 2D stroke can be applied to the one or more 3D curves, apply the 2D stroke to the one or more 3D curves including to resample in 3D the applied 2D stroke to ensure even spacing in 3D; and
if the 2D stroke cannot be applied to the one or more 3D curves, generate a new 3D curve from the 2D stroke input.

15. The system as recited in claim 14, wherein the program instructions are further executable by the at least one processor to determine one of a plurality of stroke types for the 2D stroke according to information indicating how each end of the 2D stroke interacts with a respective 3D curve, wherein each stroke type indicates a particular operation for applying the 2D stroke to the one or more 3D curves.

16. The system as recited in claim 15, wherein the plurality of stroke types include:
an oversketch stroke type indicating that the 2D stroke replaces a portion of a respective 3D curve;
an extend stroke type indicating that the 2D stroke extends a respective 3D curve;
a partial oversketch stroke type indicating that the 2D stroke is to be merged with one or more other 2D strokes to replace a portion of a respective 3D curve; or
an extend and close stroke type indicating that the 2D stroke closes a respective 3D curve.

17. The system as recited in claim 14, wherein, to apply the 2D stroke to the one or more 3D curves, the program instructions are executable by the at least one processor to:
add depth information to the 2D stroke according to a depth interpolation and extrapolation technique to promote the stroke to 3D; and
apply the 3D stroke to the one or more 3D curves.

18. A non-transitory computer-readable storage medium storing program instructions, wherein the program instructions are computer-executable to implement:
generating a three-dimensional (3D) sketch comprising a plurality of three-dimensional (3D) curves according to two-dimensional (2D) input, wherein, in said generating, the program instructions are computer-executable to implement iteratively performing;
obtaining input indicating a 2D stroke;
projecting one or more 3D curves onto a plane to create 2D curves;
analyzing the 2D stroke according to the 2D curves to determine if the 2D stroke input can be applied to the one or more 3D curves;
if the 2D stroke can be applied to the one or more 3D curves, applying the 2D stroke to the one or more 3D curves including resampling in 3D the applied 2D stroke to ensure even spacing in 3D; and
if the 2D stroke cannot be applied to the one or more 3D curves, generating a new 3D curve from the 2D stroke input.

19. The non-transitory computer-readable storage medium as recited in claim 18, wherein, in said applying the 2D stroke to the one or more 3D curves, the program instructions are computer-executable to implement performing one or more of:
merging the 2D stroke to an end of a respective 3D curve;
joining the 2D stroke to an end of a respective 3D curve by bridging a gap between an end of the 2D stroke and the end of the respective 3D curve;
replacing a portion of a respective 3D curve according to the 2D curve;
merging the 2D stroke with one or more other 2D strokes to replace a portion of a respective 3D curve;
merging two 3D curves according to the 2D stroke; or
closing a respective 3D curve according to the 2D stroke.

20. The non-transitory computer-readable storage medium as recited in claim 18, wherein, in said applying the 2D stroke to the one or more 3D curves, the program instructions are computer-executable to implement:
adding depth information to the 2D stroke according to a depth interpolation and extrapolation technique to promote the stroke to 3D; and
applying the 3D stroke to the one or more 3D curves.

* * * * *